United States Patent
Seleznev et al.

(10) Patent No.: US 12,421,573 B2
(45) Date of Patent: Sep. 23, 2025

(54) METHOD OF MANUFACTURING METAL MATRIX COMPOSITE PARTS

(71) Applicant: Markforged, Inc., Waltham, MA (US)

(72) Inventors: Maxim Seleznev, Arlington, MA (US); Joseph Roy-Mayhew, Watertown, MA (US); Jessica Faust, Tyngsborough, MA (US)

(73) Assignee: MARKFORGED, INC, Waltham, MA (US)

( * ) Notice: Subject to any disclaimer, the term of this patent is extended or adjusted under 35 U.S.C. 154(b) by 148 days.

(21) Appl. No.: 18/502,621

(22) Filed: Nov. 6, 2023

(65) Prior Publication Data

US 2024/0327952 A1    Oct. 3, 2024

Related U.S. Application Data

(60) Provisional application No. 63/423,849, filed on Nov. 9, 2022.

(51) Int. Cl.
| | |
|---|---|
| *C22C 1/10* | (2023.01) |
| *B33Y 10/00* | (2015.01) |
| *B33Y 40/20* | (2020.01) |
| *C04B 35/111* | (2006.01) |
| *C04B 35/634* | (2006.01) |
| *C04B 35/638* | (2006.01) |
| *C04B 35/64* | (2006.01) |
| *C04B 35/80* | (2006.01) |
| *C22C 29/00* | (2006.01) |
| *C22C 29/12* | (2006.01) |

(52) U.S. Cl.
CPC ............ *C22C 1/1068* (2013.01); *B33Y 10/00* (2014.12); *B33Y 40/20* (2020.01); *C04B 35/111* (2013.01); *C04B 35/634* (2013.01); *C04B 35/638* (2013.01); *C04B 35/64* (2013.01); *C04B 35/80* (2013.01); *C22C 1/1073* (2023.01); *C22C 29/005* (2013.01); *C22C 29/12* (2013.01)

(58) Field of Classification Search
CPC ...... C04B 35/111; C04B 35/64; C22C 1/1068
See application file for complete search history.

(56) References Cited

U.S. PATENT DOCUMENTS

2018/0154439 A1    6/2018    Mark

*Primary Examiner* — James Sanders
(74) *Attorney, Agent, or Firm* — PEARL COHEN ZEDEK LATZER BARATZ LLP

(57) ABSTRACT

Method of manufacturing a metal matrix composite part and ceramic preform assembly for use in the method. The method includes forming a ceramic preform using 3D printing, sintering the ceramic preform to form a sintered preform, introducing a liquid metal into the sintered preform to form the metal matrix composite part. The ceramic preform may be part of a ceramic preform assembly includes at least one ceramic preform and an infiltrant reservoir connected to the ceramic preform. The method may also include forming the ceramic preform assembly using 3D printing.

16 Claims, 15 Drawing Sheets

METHOD OF MANUFACTURING METAL MATRIX COMPOSITE PARTS

CROSS-REFERENCE TO RELATED APPLICATION

This application claims the benefit under 35 U.S.C. § 119(e) of U.S. Provisional Patent Application No. 63/423,849, filed Nov. 9, 2022, and titled "METHOD OF MANUFACTURING METAL MATRIX COMPOSITE PARTS," the entirety of which is incorporated herein by reference.

FIELD OF THE INVENTION

The invention relates to methods of manufacturing composite parts, particularly metal matrix composite parts.

BACKGROUND OF THE INVENTION

Metal matrix composites are composite materials having a metal matrix with a reinforcement (or filler) material interspersed within the metal matrix. The reinforcement material may include, for example, ceramics. Each constituent contributes certain favorable properties to the resulting metal matrix composite material. The ceramic constituent provides, for example, a low coefficient of thermal expansion (e.g., compared to aluminum alloys), high stiffness, high strength at elevated temperature, high fatigue resistance, and high wear resistance of ceramics (e.g., compared to aluminum alloys and steels). The metal constituent provides, for example, high thermal conductivity and fracture toughness.

SUMMARY OF THE INVENTION

In one aspect, the invention relates to a method of manufacturing a metal matrix composite part. The method includes forming a ceramic preform using 3D printing, sintering the ceramic preform to form a sintered preform, introducing a liquid metal into the sintered preform to form the metal matrix composite part. The ceramic preform is formed from ceramic particles.

In another aspect, the invention relates to a method of manufacturing a metal matrix composite part. The method includes forming a ceramic preform assembly using 3D printing. The ceramic preform assembly includes at least one ceramic preform and an infiltrant reservoir connected to the ceramic preform. The ceramic preform assembly is formed from ceramic particles. The method also includes sintering the ceramic preform assembly to form a sintered preform assembly including at least one sintered preform from the at least one ceramic preform and introducing a liquid metal into the sintered preform to form the metal matrix composite part.

In a further aspect, the invention relates to a ceramic preform assembly for use in manufacturing a metal matrix composite part. The ceramic preform assembly includes at least one ceramic preform formed from sintered ceramic particles and an infiltrant reservoir connected to the ceramic preform. The infiltrant reservoir is formed from sintered ceramic particles.

These and other aspects of the invention will become apparent from the following disclosure.

BRIEF DESCRIPTION OF THE DRAWINGS

FIG. 3A shows an example of an infill pattern with a triangular shape. FIG. 3B shows an example of an infill pattern with a hexagonal shape. FIG. 3C shows an example of an infill pattern with an orthogonal shape. FIG. 3D shows an example of an infill pattern with a sinusoidal shape. FIG. 3E shows an example of an infill pattern with a gyroid shape. FIG. 3F shows an example of a gradient infill pattern.

FIG. 9A shows a first time in a heating and infiltration step. FIG. 9B shows a second time, after the first time, in the heating and infiltration step. FIG. 9C shows a third time, after the second time, in the heating and infiltration step. FIG. 9D shows a fourth time, after the third time, in the heating and infiltration step.

DETAILED DESCRIPTION OF THE PREFERRED EMBODIMENTS

Figure 1:
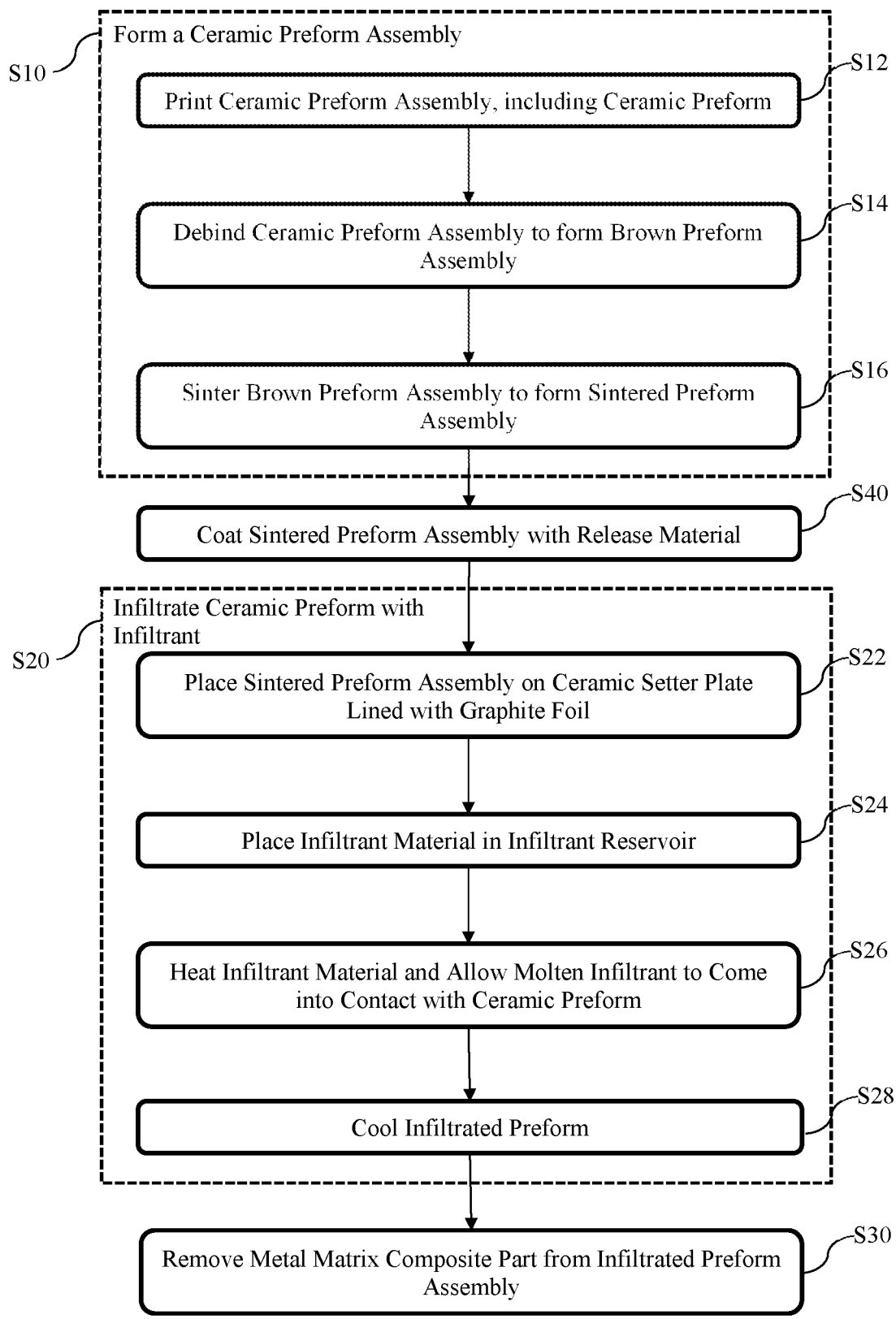
FIG. 1 is a flow diagram of a method of manufacturing a metal matrix composite according to a preferred embodiment of the invention.

Metal matrix composites have superior characteristics making them suitable for use for a variety of advanced applications, such as aerospace, ground transportation, semiconductor packaging, and others. Metal matrix composites have not been widely used in such applications, however, because of manufacturing limitations in conventional production approaches.

Metal matrix composites are difficult and expensive to manufacture and shape into a useful part using conventional approaches. When ceramic is used as the filler material, the ceramic component of the composites is very hard, making the metal matrix composite is extremely difficult to machine or otherwise shape with conventional approaches. Parts made from metal matrix composites are thus typically manufactured to the final shape of the part or near final shape of the part. Using traditional (legacy) metal matrix composite manufacturing techniques requires expensive tooling, and thus even prototype parts require a substantial investment in such tooling and modifications, further increasing the costs. Metal matrix composites can generally be one of three categories: discontinuous reinforced (particulate or rod-shaped filler), continuous reinforced (continuous fiber), or a hybrid combination of the two. Discontinuous reinforced metal matrix composites are the most common and successful method explored to date, due to the easier processing methods when compared to continuous or hybrid reinforced methods.

Conventional methods to create discontinuous metal matrix composites include die casting, infiltration, or a hybrid between the two methods. Die casting involves creating a molten mixture of the matrix metal with low volume fraction discontinuous filler (typically below 25% by volume). Then the molten mixture is cast by being poured (or otherwise placed or flowed) into a die. The molten mixture flows into the mold, creating a homogeneous microstructure and isotropic properties. Due to its relative ease of implementation, this approach can be used to make net-shape metal matrix composite parts, but die casting requires the use of a mold. As a result, part geometry is limited by mold design, and can be expensive to manufacture and iterate new designs. In addition, because this method requires flowing the molten mixture, this method cannot achieve a high concentration of filler by volume fraction (above approximately 25%) due to inability for molten mixture with a high volume fraction of filler material to flow properly in the die. Other approaches are needed if a higher stiffness, net-shape part is desired.

Infiltration involves forming a discontinuous particle filled preform, such as by injection molding. The preform can be made into the shape of the final part if a net-shape or near-net-shape highly reinforced part is desired. Then the preform is infiltrated with molten metal using, for example, pressure infiltration method or pressure-less infiltration method. In the pressure infiltration method, the preform is placed into a die or a mold, usually made of steel or graphite, and brought into physical contact with a molten metal or alloy to which external pressure is applied using a gas or a hydraulic press punch. The applied pressure forces the metal or alloy to infiltrate the porous preform. In the pressure-less infiltration method, the preform is placed into a container tray with a molten metal or alloy. This may be accomplished by placing the container with the ceramic preform and infiltrant alloy into a gas atmosphere furnace, so that a ceramic preform floats to the surface of a metal or alloy once it melts in the furnace. The porous ceramic preform then draws the molten metal or alloy in via capillary forces, and gradually settles to a tray bottom.

A metal matrix composite having a high volume fraction of filler material can be achieved by using the pressure infiltration method. The pressure infiltration method produces homogeneous microstructures, with the part having the same volume fraction of filler material throughout the part. The pressure infiltration method, however, requires injection molding to make the preform. A die for the preform is thus required. The pressure infiltration step also requires manufacturing of a die or mold. This approach thus has cost disadvantages and other limitations that result from the die/mold design.

In a hybrid diecast/infiltration method, a preform is created, as in the infiltration method discussed above, and then the preform placed in selected areas inside the die cast mold. Molten metal (or a molten mixture of metal and filler) is then forced into the die to form the part and infiltrate the pre-placed preform. The hybrid process thus shares many of the advantages and disadvantages of the die cast and the infiltration processes discussed above.

Forming a continuous fiber reinforced metal matrix composite can be difficult, and to date, continuous fiber reinforced metal matrix composites are limited to select processing methods, such as diffusion bonding, infiltration, and spinning continuous fiber on mandrels. These methods only allow parts to be produced in simple and primitive shapes, therefore restricting industrial applications. In diffusion bonding, layers of metal and dry continuous fiber are stacked to form a laminate. Then heat is applied with pressure to soften the metal and allow the metal to flow around and envelop fibers. The metal bonds to neighboring metal sheets under the applied heat and pressure forming the composite. This approach is limited to sheet geometries, which are then cut, such as by laser or water jet, into the desired shape. Infiltration is an expensive and lengthy manufacturing process similar to the infiltration process discussed above. In this infiltration process, continuous fibers are selectively placed (a fiber lay-up) into the die prior to injection molding the preform. In the spun fiber method, a continuous fiber may be wrapped around a 3D mandrel, which can then be infiltrated with molten metal. This process can be used to infiltrate thin-walled parts that have more complex shapes. The geometries, however, are still limited to bodies of revolution (e.g., tubes and cones).

The method of manufacturing the metal matrix composites according to the present invention discussed herein avoids such disadvantages. The methods discussed herein may utilize an additive manufacturing technology, such as a 3D printer, to create the ceramic preform. A ceramic preform is formed by 3D printing the ceramic into the desired shape of the component, and then an infiltration process is used to form the metal matrix around the ceramic and/or reinforcement. By 3D printing the ceramic preform, a wide variety of complex component shapes can be created quickly without the use of expensive tooling (e.g., without the need of expensive dies or molds). Alternative designs and modifications can also be quickly made. 3D printing can allow the volume fraction of filler to be varied throughout the part, creating custom microstructures, infill gradients, and lower volume percentages of reinforcement material as desired, and the methods discussed herein are not limited to parts with a homogeneous volume percentage of the filler material.

The methods discussed herein can also be used for complicated geometries with continuous fiber reinforcement. As noted above, conventional continuous fiber reinforced metal matrix composite parts are limited to primitive shapes (sheets, rods, etc.) due to processing challenges and expensive manufacturing steps, and such methods are not able to create metal matrix composite materials with internal open channels with continuous fiber reinforcement. 3D printing of the preform, which as discussed further below, involves a layer-by-layer approach, and permits custom fiber pathing in any layer with variations in volume percent of the fiber based on the number of paths printed. Complex geometries, including concentric pathing for continuous fibers in curved geometries, isotropic full fill pathing, or a combination of the two, can be used. In addition, fiber reinforcement can be selectively added in the part where the reinforcement is needed (e.g., only the exterior of the part for increased hardness or areas where higher stiffness is desired).

FIG. 1 is a flow diagram of a method of manufacturing a metal matrix composite part according to a preferred embodiment of the invention. The method discussed herein is an infiltration method that involves, in general, forming a ceramic preform assembly 100 (see FIG. 2) in operation S10, infiltrating the ceramic preform assembly 100 with an infiltrant in operation S20, and removing the metal matrix composite part from the infiltrated ceramic preform assembly 100 in step S30. Each of these steps will be discussed in more detail below.

As noted above, one aspect of the present invention relates to forming a ceramic preform 110 (see FIG. 2) as part of the ceramic preform assembly 100 (see FIG. 2), in the operation S10, by additive manufacturing, such as 3D printing, where the operation S10 includes steps S12, S14, and S16. In step S12, the ceramic preform 110 is formed using 3D printing. In the embodiments discussed herein, the ceramic preform 110 is formed as part of a ceramic preform assembly 100. Any suitable 3D printing process may be used to print ceramic particles in an arrangement to form the ceramic preform assembly 100 and ceramic preform 110. Suitable 3D printing processes include, for example, extrusion printing, fused filament fabrication, binder jetting, or selected laser sintering.

Figure 2:
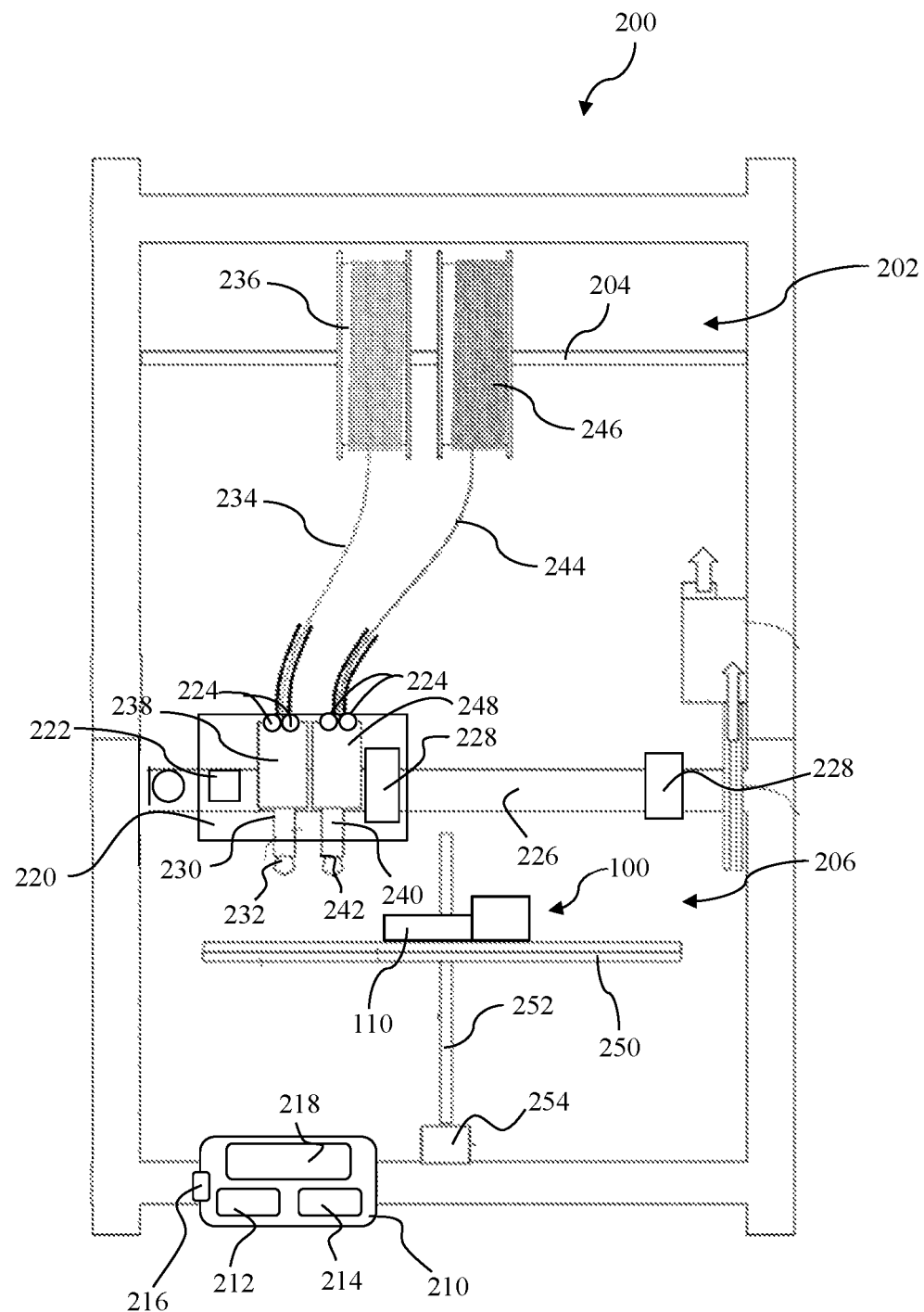
FIG. 2 shows a fused filament fabrication 3D printing apparatus used to print a ceramic preform as part of a ceramic preform assembly.

FIG. 2 shows a 3D printing apparatus 200 that may be used to form the ceramic preform assembly. The 3D printing apparatus 200 shown in FIG. 2 and described herein forms the ceramic preform assembly 100 by fused filament fabrication (FFF), and thus the 3D printing apparatus 200 in FIG. 2 is referred to herein as an FFF 3D printer 200. The FFF 3D printer 200 of this embodiment includes a controller 210, one or more print heads 230, 240, and a build platen 250 (e.g., print bed). The FFF 3D printer 200 shown in FIG. 2, includes two print heads, e.g., a first print head 230 and a second print head 240, which form part of a print head carriage 220. Although the FFF 3D printer 200 of this embodiment is shown with two print heads, the FFF 3D printer 200 may be equipped with one print head or more than two print heads. In addition, although the first print head 230 and the second print head 240 are shown and described as being part of the same print head carriage 220, and as described below, are moved together, the first print head 230 and the second print head 240 may alternatively be separate print heads that move independently of each other.

The first print head 230 includes a first nozzle 232, which in one embodiment deposits an extrudable ceramic-filled polymer stock material (herein ceramic stock material), including ceramic particles (particulate) and a binder. An extrusion process is used to deposit the ceramic stock material from a first filament formed of the extrudable ceramic-filled polymer stock material (a ceramic filament 234). The ceramic filament 234 thus may constitute the feedstock material for the printing process of the ceramic preform. In the discussion below, reference may be made to the composition of the ceramic filament 234, such a reference also applies to the ceramic stock material.

The ceramic filament 234 includes ceramic particles (e.g., particulate) of a ceramic material. The ceramic particles are preferably spherical or at least spheroidal shape. These shapes help ensure that the ceramic particles slide easily past each other during extrusion, while also packing densely. The particles, however, are not so limited, and the ceramic particulate may include tubes, rods, plates, whiskers, and cones. The average size of the ceramic particle is preferably less than 1000 micrometers and may be from 0.1 micrometers to 1000 micrometers. In other embodiments, the particle average size may preferably be from 1 micrometer to 20 micrometers, and more preferably from 1 micrometers to 10 micrometers. These ceramic particle sizes are preferred to also balance printing considerations and to provide the desired amount of bonding, as some slight bonding of the particles is desired to maintain the shape of the preform. The particles must fit through the nozzle of the printer and so be scaled appropriately to prevent jamming. If the particles are too small, such as nanoparticles, the nanoparticles may increase the viscosity significantly, which would be undesirable for printing. Larger particles are difficult to sinter and a preform 110 formed from large particles may be weak and difficult to handle. Smaller particles may excessively sinter, reducing the volume in the preform designated for infiltrant alloy.

The ceramic particulate may be any suitable particulate to be used as a reinforcement material for the metal matrix composite. In preferred embodiments, the ceramic particulate comprises silicon nitride particulate, boride-based particulate, silicon particulate, silicon carbide-based particulate, oxycarbide-based particulate, graphite particulate (including carbon nanotubes and graphene), alumina particulate, alumina-based particulates, yttrium aluminum garnet (YAG) particulate, yttria alumina zirconia (YAZ) particulate, zirconia particulate, silica particulate, and silicate-based particulates, boron particulate, boron carbide particulate, metal carbide particulate, or a combination thereof.

The binder material may be a polymer binder, and preferably, the polymer binder includes a solvent-washable component(s), e.g., a soluble-pyrolysable binder, and backbone polymer component(s), e.g., a pyrolysable second stage binder. In one embodiment, the backbone polymer component cleanly decomposes during thermal debinding without leaving carbon residue. Some soluble-pyrolysable binder combinations include one or more of petrolatum, polyethylene glycol (PEG), polymethyl methacrylate (PMMA) (optionally in emulsion form), stearic acid, waxes (for example, carnauba, bees wax, paraffin), steatite, polyethylene (PE), and polyvinylbutyral (PVB). Some pyrolysable second stage binders may include one or more of polyolefin resins including polypropylene (PP), high-density polyethylene (HDPE), linear low-density polyethylene (LLDPE), and copolymers thereof.

Polyoxymethylene copolymer (POM) may also be used as a binder when, for example, a catalytic debinding process using nitric acid vapor is used. Other examples of polymeric binders that may be used as either first or second stage binders, depending on the system, include, for example, polyethers such as poly(ethylene oxide)s (also known as poly(ethylene glycol)s, poly(propylene oxide)s, (also known as poly(propylene glycol)s, ethylene oxide-propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates), and poly(vinylbutyral), polyvinyl alcohol and its derivatives, polyamide (PA), ethylene/vinyl acetate polymers, acrylic polymers and copolymers, styrenefacrylic copolymers, styrene-maleic anhydride copolymers, isobutylene/maleic anhydride copolymers, vinyl acetate/ethylene copolymers, ethylene-acrylic acid copolymers, polyolefins, polystyrenes, olefin and styrene copolymers, epoxy resins, acrylic latex polymers, polyester acrylate oligomers and polymers, and/or polyester diol diacrylate polymers.

The volume fraction of ceramic particles in the binder is preferably 40% or greater, more preferably from 55% to 67%, and even more preferably from 58% to 62%. A volume fraction less than 40% may be too weak to form a self-supporting preform 110 after the polymer binder is removed, and the inventors have found that a volume fraction of at least 55% forms a sufficiently strong and self-supporting preform 110 after binder is removed. Volume fractions greater than 67% may cause issues during the 3D printing process. The viscosity of the extrudable stock material increases exponentially at volume fractions greater than 67%, preventing the extrudable stock material from flowing and being printable. In one embodiment, the viscosity of the extrudable stock material at an extrusion temperature is preferably from 10 Pa*s to 1000 Pa*s (at 100 s$^{-1}$ shear rate), more preferably from 20 Pa*s to 500 Pa*s, and even more preferably from 50 Pa*s to 250 Pa*s.

The feedstock material may be stored in any suitable storage container or reservoir for the form of the feedstock material. In this embodiment, the feedstock material is the ceramic filament 234, but other feedstock forms include, for example, rods, pellets, powders, and pastes. Suitable storage containers for the ceramic filament 234 include, for example, spools. In this embodiment, the ceramic filament 234 is wound on a first spool (ceramic filament spool 236). The ceramic filament spool 236 is stored in a storage chamber 202 of the FFF 3D printer 200. The storage chamber 202 of this embodiment is heated and is located above the print head carriage 220 and the build platen 250. In the embodiment shown in FIG. 2, the ceramic filament spool 236 is vertically arranged in a rotating spool holder 204 (e.g., a shaft), but other suitable arrangements of the ceramic filament spool 236 in the storage chamber 202 may be used, including those shown and described in U.S. Patent Application Pub. No. 2018/0154439, the disclosure of which is incorporated by reference herein in its entirety and, more specifically, shown and described in FIGS. 15 and 16 of U.S. Patent Application Pub. No. 2018/0154439.

As noted above, an extrusion process is used to deposit the ceramic stock material from the ceramic filament 234. The print head carriage 220 includes one or more heaters 222 to heat and melt the ceramic filament 234, and more specifically, the binder of the ceramic filament 234 within a melt chamber 238 of the first print head 230. Feed rollers 224 may be used to feed the ceramic filament 234 to the first print head 230. In this embodiment, the feed rollers 224 are arranged directly upstream of the melt chamber 238 in the first print head 230. The feed rollers 224 nip and feed the ceramic filament 234 such that the ceramic filament 234 is melted in the melt chamber 238 and then extruded from the first nozzle 232.

The first print head 230 selectively deposits the ceramic stock material on the platen 250 to build successive layers and form a three-dimensional structure, as will be described further below. One or both of (i) the position and orientation of the platen 250 or (ii) the position and orientation of the print head carriage 220 and, more specifically, the first nozzle 232 of the first print head 230 are controlled by the FFF 3D printer 200 and, more specifically, the controller 210 to deposit the ceramic stock material in the desired location and direction. The print head carriage 220 and the platen 250 may be located in a print chamber 206, which in this embodiment is below the storage chamber 202. The print chamber 206 may be heated or otherwise have the atmosphere controlled as is suitable for the materials being deposited from the first nozzle 232 on to the platen 250.

The controller 210 controls the relative position of the first nozzle 232 relative to the platen 250 by suitable position and orientation control mechanisms. Such position and orientation control mechanisms include, for example, gantry systems, robotic arms, and/or H frames that incorporate electrical motors, hydraulic cylinders and motors/pumps, pneumatic cylinders and motors/pumps, and other actuators. In the embodiment shown in FIG. 2, for example, the print head carriage 220 is movably connected to a gantry system 226, and motors 228 move the print head carriage 220 in X and Y directions. The controller 210 is operatively coupled to the motors 228 to move the print head carriage 220 and, more specifically, the first nozzle 232 of the first print head 230 in the X and Y directions. Likewise, the platen 250 is supported by an H-frame 252 in this embodiment and the height of the platen 250 is controlled by a motor 254 to adjust the relative position of the platen 250 to the print head carriage 220 in the Z direction. The controller 210 is operatively coupled to the motor 254 to control the height of the platen 250.

Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (e.g., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate), or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

The position and orientation control mechanisms (print head carriage 220 drive and platen 250 drive) may be equipped with position and/or displacement sensors. The controller 210 may be communicatively coupled to these sensors to receive an input from the sensors to monitor the relative position or velocity of the print head carriage 220 and, more specifically, the first nozzle 232 of the first print head 230 relative to the platen 250 and/or the layers of the object being constructed. The controller 210 may use sensed X, Y, and/or Z positions and/or displacement or velocity vectors to control subsequent movements of the first nozzle 232 or platen 250. The FFF 3D printer 200 may optionally include a laser scanner to measure distance to the platen 250 or the layer, displacement transducers in any of three translation and/or three rotation axes, distance integrators, and/or accelerometers detecting a position or movement of the first nozzle 232 to the platen 250.

In this embodiment, the controller 210 is a microprocessor-based controller that includes a processor 212 for performing various functions discussed herein, and a memory 214 for storing various data. The processor 212 may also be referred to as a central processing unit (CPU). In one embodiment, the various methods discussed below may be implemented by way of a series of instructions stored in the memory 214 and executed by the processor 212. The memory 214 may include read-only memory (ROM) and random-access memory (RAM), and the memory 214 may be communicatively coupled to the processor 212 by a bus. The controller 210 may also include communication devices 216 (e.g., input and output ports or receivers and transmitters) that allow the controller 210 to communicate with other devices using appropriate communication protocols. The controller 210 may also include a user interface 218 to receive inputs from a user of the FFF 3D printer 200. The communication devices 216 and user interface 218 may be communicatively coupled to the processor 212 and the memory 214 by the bus.

To print the ceramic preform 110, a print file containing the ceramic preform 110 to be printed (or alternatively, a set of print commands) is input into the controller 210. The ceramic preform 110 may be designed in a 3D computer aided design (CAD) program and then input into a suitable 3D print program, such as Eiger, produced by Markforged of Watertown, Massachusetts, to produce the print file. The 3D print program sizes ceramic preform 110 for printing by accounting for changes to the part during manufacturing (for example, shrinkage), adds additional components of the ceramic preform assembly 100 (as will be discussed further below), and then slices the ceramic preform assembly 100 into a plurality of layers ("slices") to create the print file. A "slice" is a single layer or lamina to be printed in the 3D printer, and a slice may include one segment or many segments, including segments of different materials. When printing is initiated, the controller 210 reads the print file (or set of print commands). "Segment" as used herein corresponds to "toolpath" and "trajectory", and means a linear row, road, or rank having a beginning and an end, which may be open or closed, a line, a loop, curved, straight, etc. A segment begins when the first print head 230 begins a continuous deposit of material, and terminates when the printhead stops depositing, and in the context of this application, a "linear" segment encompasses both curvilinear segments and rectilinear segments. The controller 210 moves and operates the first print head 230 to extrude the ceramic stock material from the first nozzle 232 and deposit the ceramic stock material on the platen 250 (for the first slice) or on a previous layer (for subsequent slices) in the manner discussed above.

When the controller 210 finishes the segment, the controller 210 then determines if the slice is complete. If the slice is not complete, the controller 210 proceeds to the next segment. If the slice is complete, the controller 210 determines if the ceramic preform assembly 100 is complete. If the ceramic preform assembly 100 is not complete, the controller 210 proceeds to the next slice. If the ceramic preform assembly 100 is complete, the printing process ends. The ceramic preform assembly 100, including the ceramic preform 110 in the as-printed state, may be referred to as green ceramic preform assembly 100.

As discussed above, the first print head 230 extrudes the ceramic particulate, encapsulated in the binder (e.g., polymer and wax), while the first print head 230 moves, forming a plurality of ceramic print layers by depositing the ceramic stock material in a pattern to form the ceramic print layer of the green ceramic preform assembly 100. In some embodiments, the layer will be a generally solid layer of deposited ceramic stock material, having an infill density of 100% (e.g., if maximum stiffness is desired). In other embodiments, an infill density of less than 100% may be used (e.g., to balance between stiffness and fracture toughness or to selectively reinforce specific aspects of a part.) A gradient fill, for example, can be used to tune properties and density towards specific application. In a gradient infill, the density of the infill is varied in one or more of the X, Y, and Z directions.

Figure 3A:
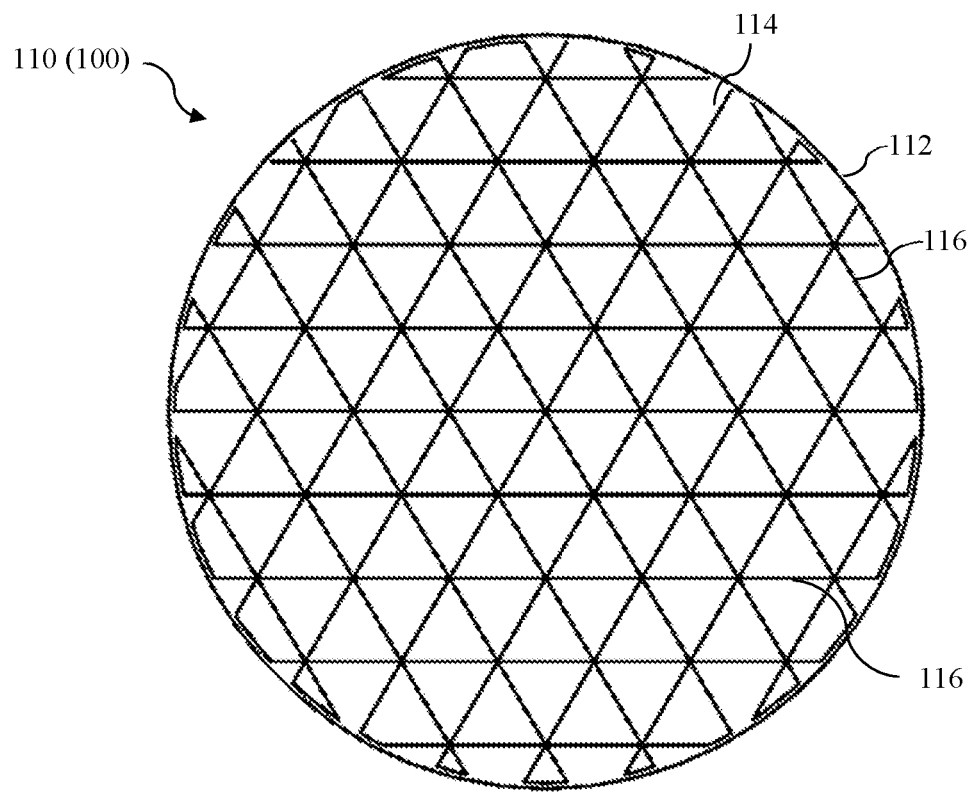
FIGS. 3A-3F show different geometries of an infill pattern that may be used to form the preform.
Figure 3B:
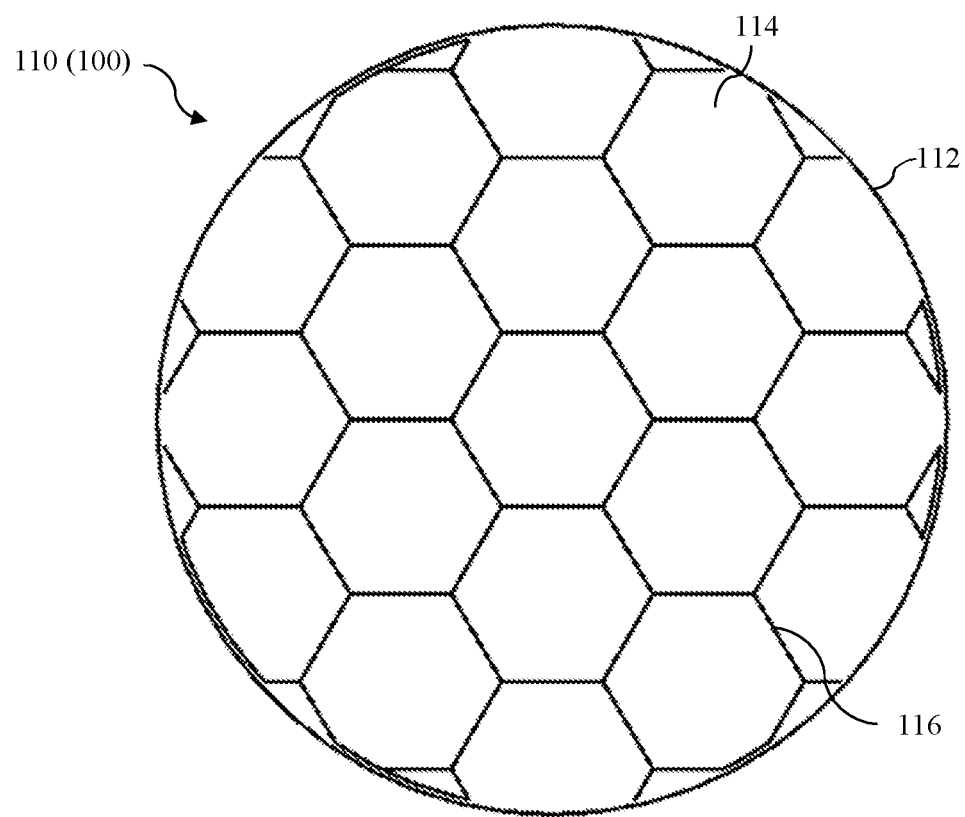
Figure 3C:
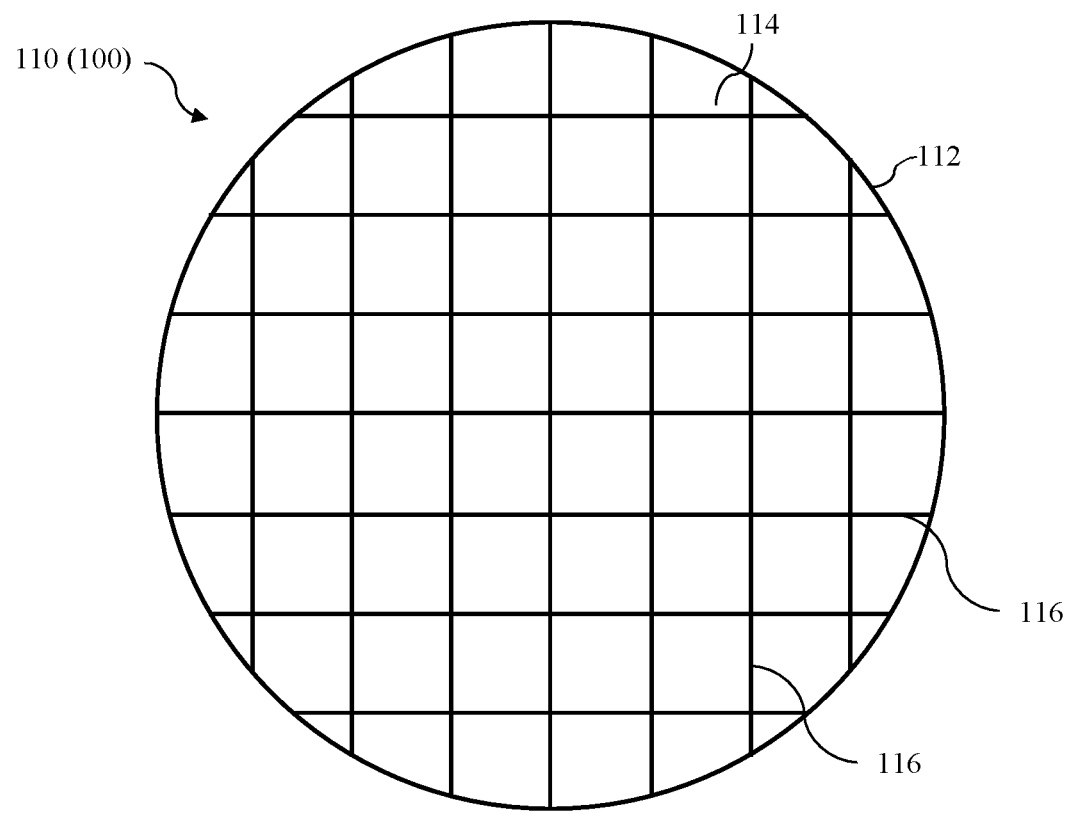
Figure 3D:
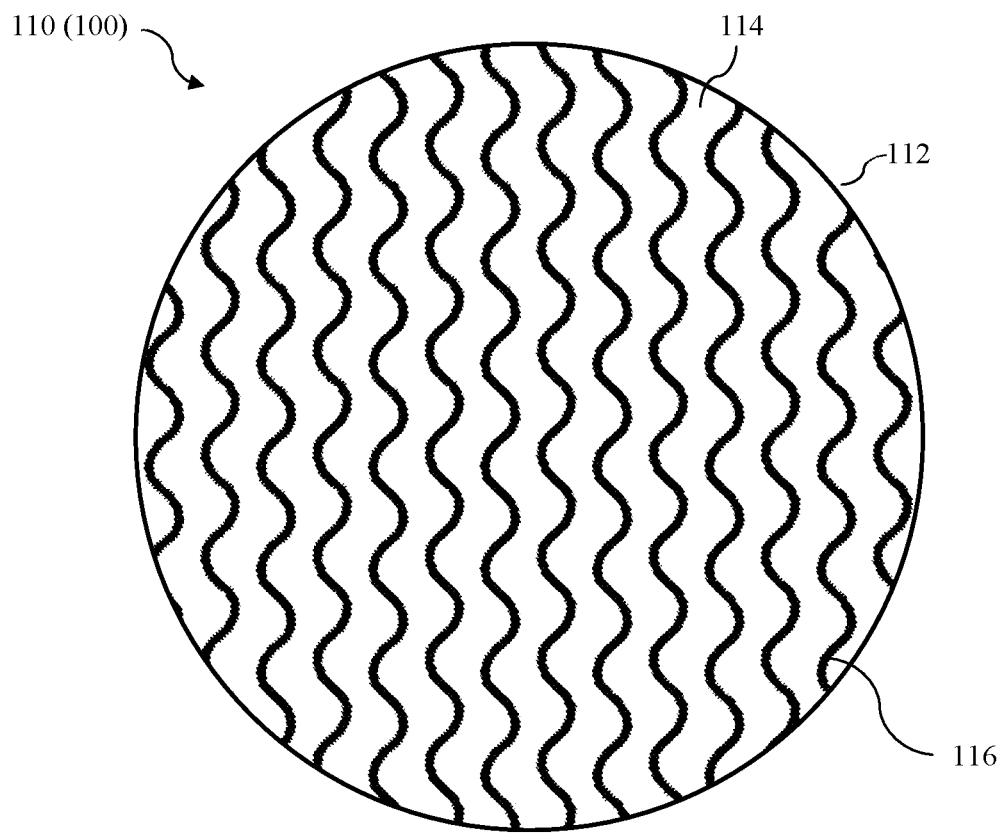
Figure 3E:
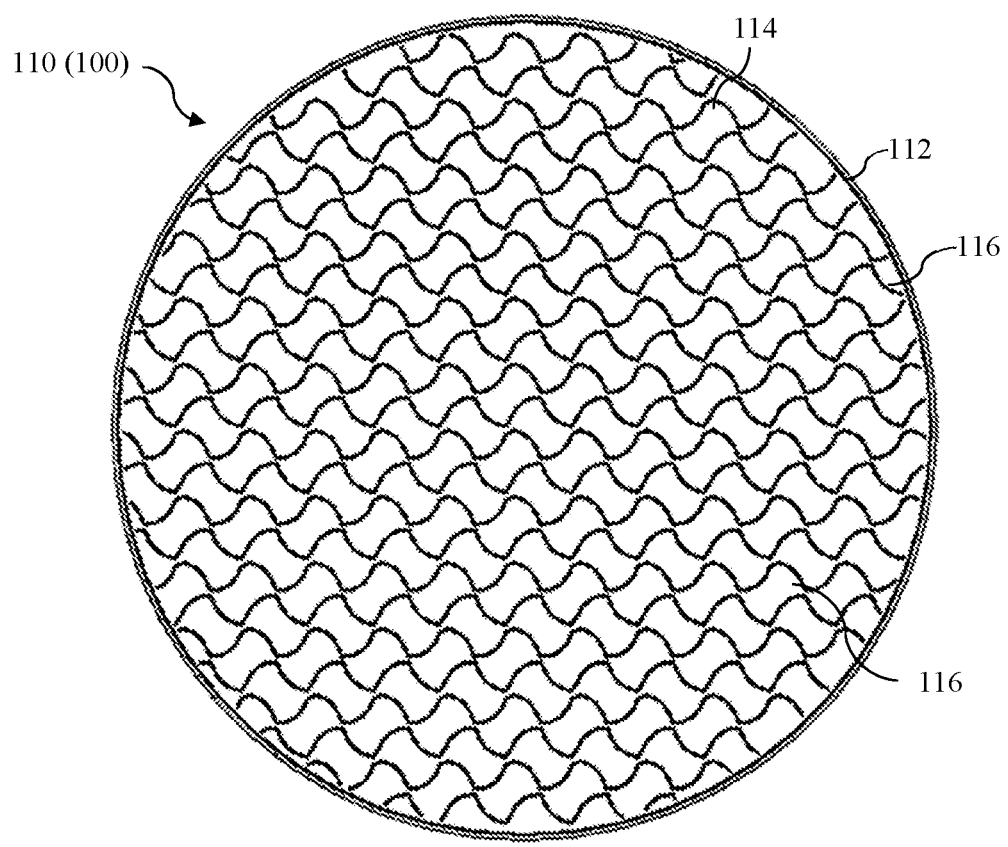
Figure 3F:
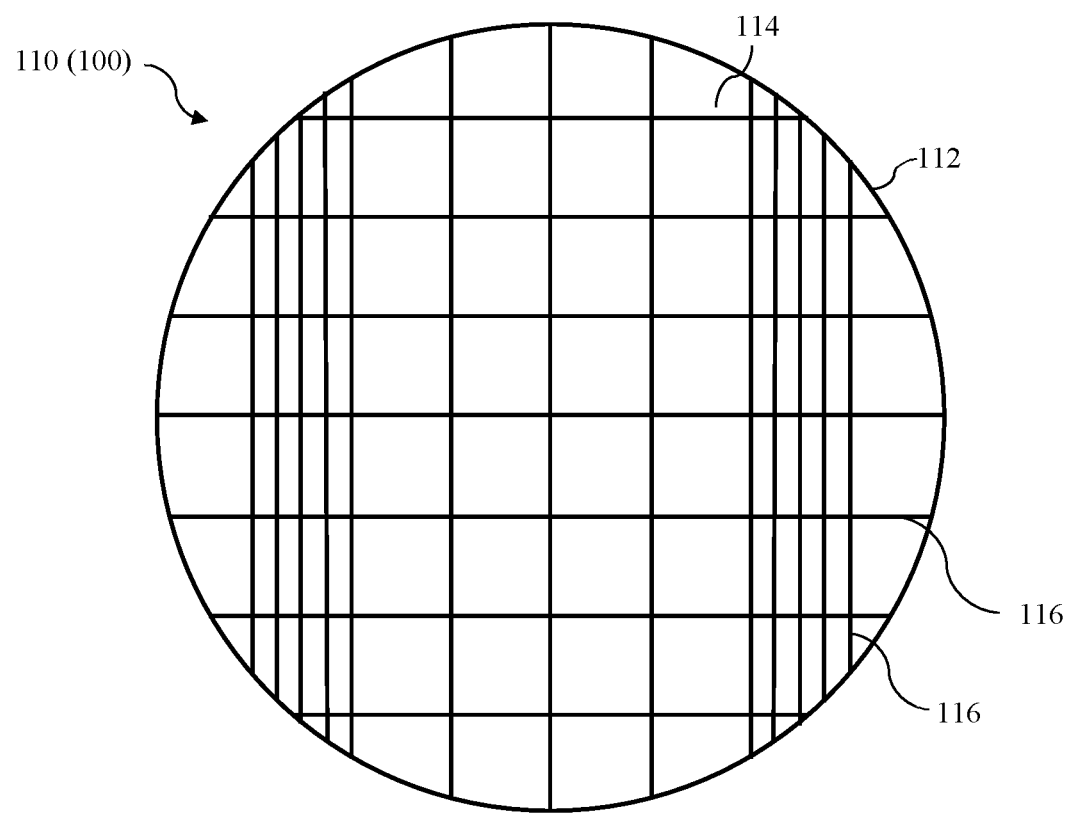

In some embodiments, the ceramic stock material is deposited in a pattern to form an outside shell 112 and an internal infill 114, as shown in FIGS. 3A-3F. The infill 114 may be formed from a plurality of infill supports 116. The infill supports 116 are formed by the ceramic filament 234 being deposited in a pattern to form the infill supports 116. Suitable patterns include those exhibiting a periodic structure, an arbitrary structure, or a gyroid shape. FIG. 3A shows an example of an infill pattern for the infill supports 116 having a triangular shape. FIG. 3B shows an example of an infill pattern for the infill supports 116 having a hexagonal shape. FIG. 3C shows an example of an infill pattern for the infill supports 116 having an orthogonal shape. FIG. 3D shows an example of an infill pattern for the infill supports 116 having a sinusoidal shape. Such infill patterns are examples of a geometric patterns exhibiting a periodic structure, but any suitable pattern/structure may be used. FIG. 3E is another example of an infill pattern for the infill supports 116. The infill pattern in FIG. 3E is a gyroid shape. As noted above, a gradient infill may be used. FIG. 3F is an example of an infill pattern where the density of infill supports 116 is varied in at least one of the X, Y, and Z directions to form a gradient infill. In this particular example, the density of the infill supports 116 is varied in the X direction.

The selectability among different infill densities and different infill patterns enables an engineer to control the properties of a metal matrix composite part at a qualitatively high level. The stiffness, strength, toughness, or thermal conductivity can be changed in the metal matrix composite part in pre-determined cross sections or directions in the part. For example, selection of a gyroid infill pattern (see FIG. 3C) may provide the final metal matrix composite part with near-isotropic mechanical and thermal properties, while selection of a triangular infill pattern (see FIG. 3A) may provide the final metal matrix composite part with anisotropic properties.

Using 3D printing to form the ceramic preform 110 allows the metal matrix composite part to be a fiber reinforced metal matrix composite material. As discussed above, the FFF 3D printer 200 includes a second print head 240, as shown in FIG. 2. The second print head 240 includes a second nozzle 242, which in one embodiment, deposits an extrudable fiber-filled polymer stock material (herein fiber stock material) including fibers as a binder. An extrusion process is used to deposit the fiber stock material from a second filament formed of the fiber stock material (a fiber filament 244). The fiber filament 244 thus may constitute the feedstock material for the printing process of the metal matrix composite part. In the discussion below, reference may be made to the composition of the fiber filament 244, such a reference also applies to the fiber stock material.

The extrusion process used to deposit the fiber stock material from the second print head 240 is similar to the process discussed above to deposit the ceramic stock material, and that discussion above also applies to the second print head 240. The fiber filament 244 is fed by feed rollers 224 into a melt chamber 248 of the second print head 240, where the one or more heaters 222 heat and melt fiber filament 244 and, more specifically, the binder of the ceramic filament 244, before being extruded from the second nozzle 242. Likewise, the fiber filament 244 is wound on a second spool (fiber filament spool 246) and stored in the storage chamber 202 of the FFF 3D printer 200, in the same or similar manner as the ceramic filament spool 236. In addition, the binder of the fiber filament 244 may be formulated like the binder of the ceramic filament 234, and the discussion of the binder of the ceramic filament 234 above also applies to the fiber filament 244. The binder of the ceramic filament 234 and the fiber filament 244 may be the same or different.

The fiber filament 244 may include continuous fibers or discontinuous fibers (e.g., whiskers) within the polymer binder. The fiber reinforcement, whether continuous or discontinuous, may comprise silicon nitride-based fibers, boride-based fibers, silicon carbide-based fibers, oxycarbide-based fibers, carbon fibers, alumina fibers, alumina-based fibers, yttrium aluminum garnet (YAG) fibers, zirconia fibers, silica fibers, silicate-based fibers, boron fibers, or combinations thereof.

Figure 4A:
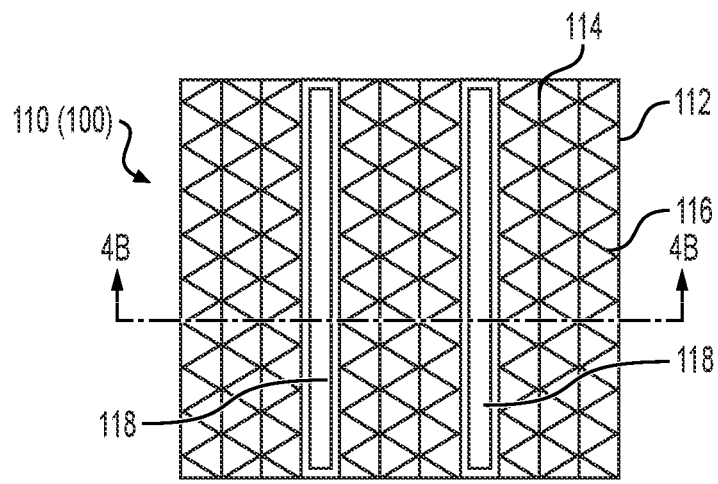
FIG. 4A is a schematic top view of a pattern of forming the layers of the ceramic preform with continuous fiber reinforcement during the 3D printing process.
Figure 4B:
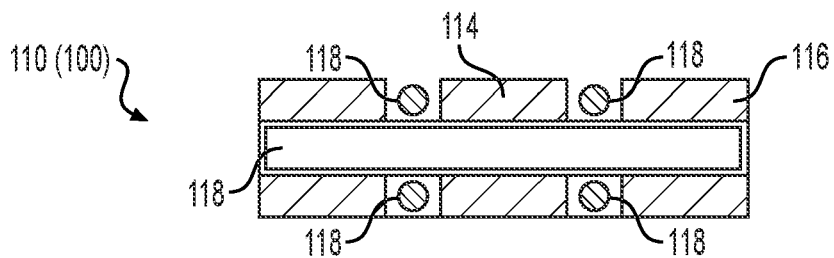
FIG. 4B is a cross-sectional view taken along line 4B-4B in FIG. 4A.

FIG. 4A is a schematic top view of a pattern of forming the layers during the 3D printing process of forming the ceramic preform 110 using the fiber filament 244, and FIG. 4B is a cross-sectional view taken along line 4B-4B in FIG. 4A. FIGS. 4A and 4B show an infill 114 with continuous fibers 118 printed by the fiber filament 244. In this embodiment, a plurality of continuous fibers 118 are aligned parallel to each other. More specifically, the continuous fibers 118 are aligned parallel to each other in each slice (or layer) of the green ceramic preform 110, but continuous fibers 118 in one slice (or layer) are oriented transverse and, more specifically in this embodiment, orthogonal to the continuous fibers 118 in another slice (or layer) such as the immediate preceding and/or succeeding slice (or layer). Other orientations and arrangements of the discontinuous fibers 122 may be used.

Figure 5:
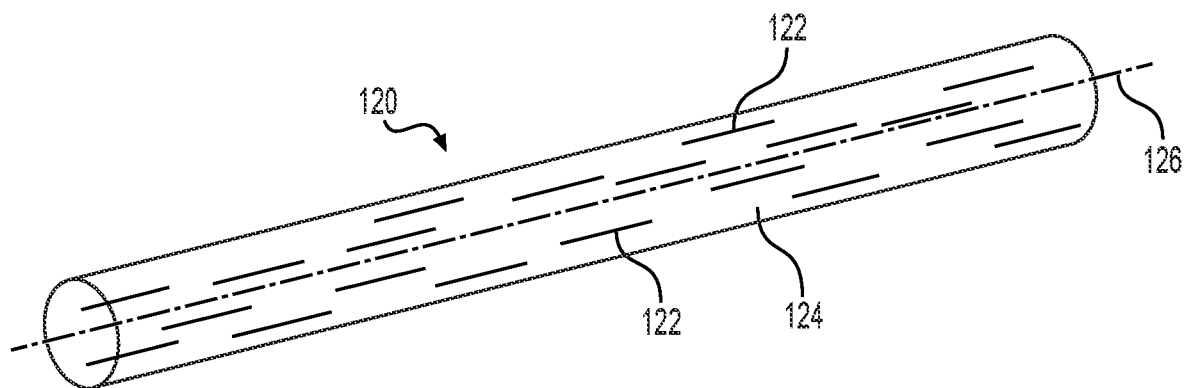
FIG. 5 shows an extruded bead of a fiber stock material used for the ceramic preform with discontinuous fiber reinforcement.

FIG. 5 shows an extruded bead 120 of the fiber stock material (fiber filament 244) extruded from the second print head 240 using discontinuous fibers 122. The discontinuous fibers 122 are suspended within binder 124. When discontinuous fibers 122 (or whiskers) are used, the discontinuous fibers 122 may be extruded with the extruded bead 120 having a central axis 126, and the discontinuous fibers 122 (or whiskers) being aligned along the central axis 126. The extruded bead 120 and, more specifically, the central axis 126 may be oriented and printed in the orientations and positions of the continuous fibers 118 as discussed above with respect to FIGS. 4A and 4B.

The volume fraction of the discontinuous fibers 122 in the binder 124 (fiber filament 244) may be 65% or less, more preferably 55% or less, and even more preferably 45% or less. In addition, the volume fraction of the discontinuous fibers 122 in the binder 124 (fiber filament 244) may be 5% or more, more preferably, 15% or more, and even more preferably 35% or more. The volume fraction of the discontinuous fibers 122 may be determined based upon the load intended to be supported by the fiber reinforcement in the metal matrix composite part. A percolation threshold may be determined based on the properties of the discontinuous fibers 122 and the matrix (metal in this embodiment), such as the aspect ratio and surface area of the discontinuous fibers 122. This percolation threshold may be the minimum amount of discontinuous fibers 122 needed to transfer a load and the amount of load transferred may increase linearly with increasing volume fraction above the percolation threshold. At concentrations below the percolation threshold, the discontinuous fibers 122 may have a deleterious effect as the discontinuous fibers 122 act as stress concentrators. In the embodiments discussed herein the discontinuous fibers 122 are preferably self-supporting after the binder is removed in the debind process. To be self-supporting, the volume fraction of the discontinuous fibers 122 in the binder 124 (fiber filament 244) may be 40% or more, more preferably, 45% or more, and even more preferably 55% or more. In some embodiments, these endpoints can be combined to determine suitable ranges for the volume fraction of the discontinuous fibers 122 in the binder 124 (e.g., from 5% to 65%, from 5% to 55%, from 15% to 45%, from 35% to 65%, or from 40% to 65%).

Longer discontinuous fibers 122 are generally preferred to provide for better reinforcing properties. Accordingly, the average length of the discontinuous fibers is preferably at least 10 times the average diameter of the discontinuous fibers, and more preferably at least 20 times the average diameter of the discontinuous fibers.

Although the discussion above includes placing the continuous fibers 118 or discontinuous fibers 122 by co-printing, other approaches may be used to place the fiber reinforcement. For example, trenches or channels may be designed within the ceramic preform. After the trenches are printed, but not covered by subsequent print layers, the printing process is paused and tows of continuous fiber 118 are placed into the trenches. The fibers may be placed by hand or by an automated means such as a robotic arm. Then, the print process is resumed so that the trenches where the fiber was placed are covered by ceramic-filled polymer extruded beads.

The trenches may be sized such that there is a gap between the continuous fiber 118 and adjacent infill supports 116 after the debinding operation. The ceramic preform may shrink by about 3% during sintering, and if the continuous fiber 118 is closely packed against adjacent infill supports 116, the ceramic particles of the infill supports 116 may impinge on the continuous fiber 118 causing defects, such as cracks, in the continuous fiber 118. The gap may be obtained by infusing the continuous fiber 118 with additional binder during the printing process or using a polymer binder with particulate. In some embodiments, the continuous fiber 118 is in the form of a bundle of continuous fibers 118 and a gap is also preferably formed between continuous fibers 118 of the bundle. When a polymer binder with particulate is used, the added particulate can help spread and create space between the continuous fibers 118 of the bundle.

Figure 6:
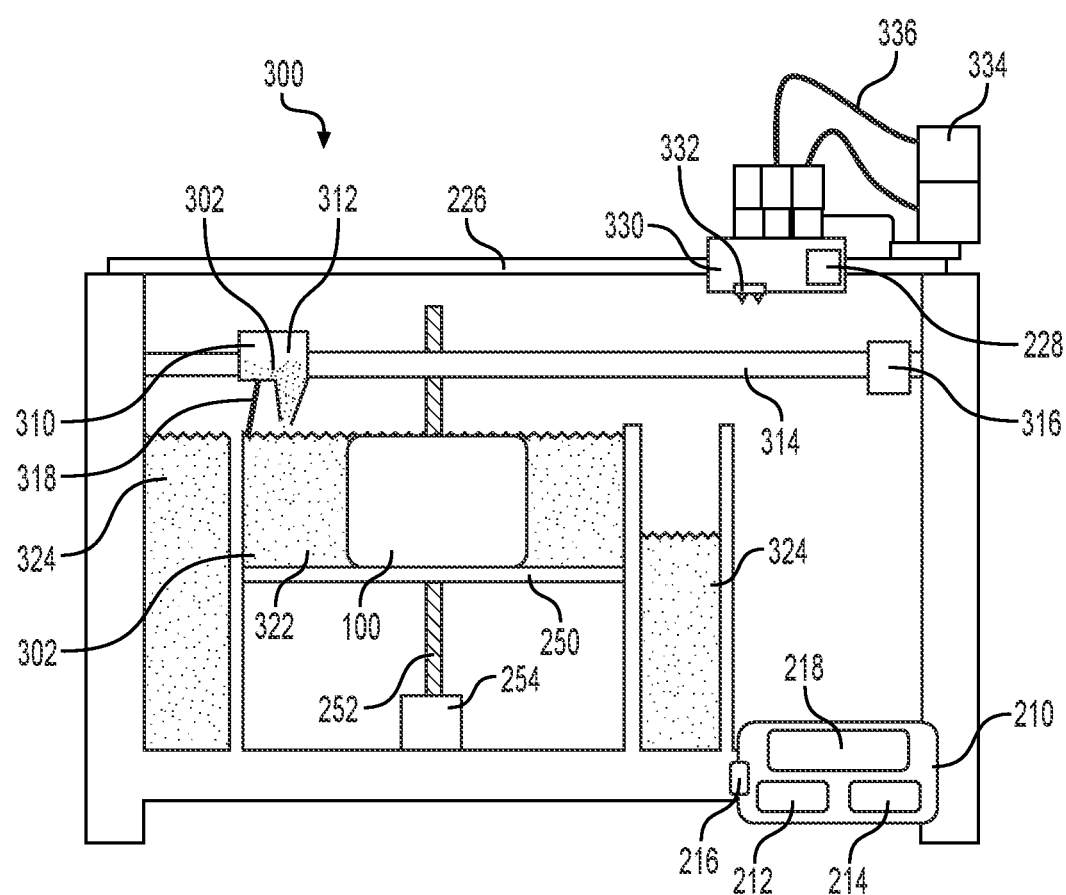
FIG. 6 shows a binder jetting 3D printing apparatus used to print the ceramic preform as a part of the ceramic preform assembly.

FIG. 6 shows another 3D printing apparatus 300 that may be used to form the ceramic preform assembly. The 3D printing apparatus 300 shown in FIG. 3 and described herein forms the ceramic preform assembly 100 by binder jetting, and thus the 3D printing apparatus 300 in FIG. 6 is referred to herein as a binder jet 3D printer 300. The binder jet 3D printer 300 may have the same or similar components as the FFF 3D printer 200 discussed above. The same reference numerals are used in FIG. 6 for these same and similar components. The discussion above of these components applies here, and a detailed discussion of these components is omitted here.

The binder jet 3D printer 300 includes a recoater 310 with a feedstock reservoir 312. The ceramic stock material of this embodiment is a ceramic powder 302, which can comprise any of the ceramic particles discussed above, and the discussion of the ceramic particles above also applies to the ceramic powder 302 of this embodiment. The ceramic powder 302 is stored in the feedstock reservoir 312 and applied to the platen 250 in a layer by recoater 310. The recoater 310 may be moved by any suitable position and orientation control mechanism, such as those discussed above, to apply the ceramic powder 302 to the platen 250. In the embodiment shown in FIG. 6, for example, the recoater 310 is movably connected to a rail 314, and a motor 316 moves the recoater 310 in one of the X and Y directions. The platen 250 is located within a powder bed 322, and the recoater 310 thus applies unbound ceramic powder 302 to the powder bed 322. The recoater 310 may also include a leveler 318, such as a leveling roller or a leveling blade that levels the unbound ceramic powder 302 within the powder bed 322 as the recoater 310 is moved across the powder bed 322. Excess ceramic powder 302 may be captured by feedstock overflow reservoirs 324. The feedstock overflow reservoirs 324 are positioned adjacent to the powder bed 322 to receive excess ceramic powder 302 retained by the leveler 318 as the leveler 318 moves across the powder bed 322.

The binder jet 3D printer 300 also includes a print head carriage 330. The print head carriage 330 is moveable by any suitable position and orientation control mechanism, such as those discussed above, but in this embodiment is moveable by the gantry system 226 and motors 228 in a manner similar to the print head carriage 220 discussed above. The print head carriage 330 includes one or more print heads 332 that are fluidly coupled to a binder reservoir 334 by, for example, a supply line 336. The print head 332 may include an array of orifices (plurality of orifices) configured to eject binder therefrom using a suitable method, such as bubble jetting. As the print head carriage 330 and, more specifically, the print head 332 is moved over the powder bed 322, the print head 332 selectively jets or otherwise applies binder to the ceramic powder 302 in the powder bed 322 to form a slice and segment of the ceramic preform 110. Any suitable binder may be used, including those discussed above. Typical binders include, for example, polyvinylpyrrolidone, polyvinyl alcohol, and other water-soluble polymers, although other polymer solvent systems can be used, similar to those discussed above.

After the binder is applied by the print head 332, the platen 250 is lowered and the steps of applying the ceramic powder 302 with the recoater 310 and then applying the binder with the print head 332 are repeated for subsequent layers. The controller 210 controls this process in a manner similar to the controller 210 discussed above with respect to the FFF 3D printer 200. After the binder sets, excess loose ceramic powder 302 is removed, leaving a bound ceramic preform 110 as part of a bound ceramic preform assembly 100 (a green ceramic preform 110 that is part of a green ceramic preform assembly 100) for further processing. The various morphologies, materials, geometric patterns, and processes described above with respect to the ceramic preform assembly 100 produced by the fused filament fabrication method may also be applicable to the binder jetting process.

Referring back to FIG. 1, the second step S14 in the operation S10 is removing the binder (debinding). This step is used when the ceramic preform assembly 100 and ceramic preform 110 are formed using a binder. After the ceramic preform assembly 100 is printed, the green ceramic preform assembly 100 is transferred to a debinding chamber (optionally, the debinding chamber is integrated in the 3D printer or vice versa). Debinding includes removing at least one binder component from the ceramic material using a thermal process, a solvent process, a catalysis process, or a combination of these, leaving a porous ceramic structure (brown ceramic preform 110 which is part of a brown ceramic preform assembly 100). Any suitable debinding process may be used, and other debinding processes may be used in addition to, or in lieu of, the processes discussed below. Such other debinding processes may include catalytic debinding processes, using, for example, a concentrated nitric acid vapor.

In some embodiments, the binder used to print the ceramic preform assembly 100 includes a washable component (e.g., a polymer binder with a washable component) that may be removed by exposing the binder in the green ceramic preform assembly 100 to a solvent. The binder is exposed to the solvent by treating the green ceramic preform assembly 100 with the solvent and bringing the solvent into contact with the binder. For example, the solvent may be removed by placing the green ceramic preform assembly 100 (see FIG. 2) into a solvent bath. The green ceramic preform assembly 100 may be submerged in the solvent bath for a period of time as the solvent is circulated to remove the dissolvable component of the polymer binder. When wax-like washable components of the binder are used, organic solvents are used. If the washable component of the binder is water-soluble, for example PEG, water could be used to dissolve the washable component of the binder. In some embodiments, a thermal debinding process may be used in addition to, or in lieu of, the solvent-based processes. Here, the green ceramic preform assembly 100 (or brown ceramic preform assembly 100 after solvent debinding) is heated to a temperature, using, for example, a furnace, to remove the binder. The non-washable binding component of the binder, for example, may be pyrolised with, in some cases, the assistance of catalyzing or other reactive agents in gas or otherwise flowable form. For example, in one embodiment, where the ceramic preform assembly 100 was formed using fused filament fabrication in step S12, both solvent and thermal debinding processes may be employed, but in another embodiment where the ceramic preform assembly 100 was formed using binder jetting in step S12, the thermal debinding process may be employed and the solvent debinding process may be omitted.

After debinding in step S14, the brown ceramic preform assembly 100 (see FIG. 2) is sintered in step S16. The brown ceramic preform assembly 100 is transferred to a sintering chamber or furnace (optionally combined with the printer and/or debinding chamber). The brown ceramic preform assembly 100 is brought to a sintering temperature suitable for the type of ceramic being used to form the ceramic preform 110 (see FIG. 2) and powder size of the ceramic particulate. Suitable temperatures include, for example between 1100 C and 1600 C. Likewise, sintering times (hold times) and ramp rates to the sintering temperatures are also based on temperature, ceramic type, and powder size.

The brown ceramic preform assembly 100 is then sintered at the sintering temperature to sinter the ceramic preform 110. The brown ceramic preform assembly 100 is sintered to form a porous, sintered ceramic preform 110. To form such a porous ceramic preform 110, the brown ceramic preform 110 may be partially sintered to form a partially sintered ceramic preform 110 that is less than 100% dense, preferably less than 80% dense, and more preferably less than 65% dense. The sintering is preferably conducted to develop slight particle-to-particle bonding that is just enough to retain the shape of the preform during handling. In such a case, the linear shrinkage of the ceramic preform assembly 100 and, more specifically, the ceramic preform 110 from its pre-sintered condition to its post-sintered condition is preferably 3% or less. The partial sintering allows for handling but also for the molten/liquid infiltrant (discussed further below) to flow between and around the ceramic particles. This state may be a bisque-sintered condition.

Depending upon the ceramic used for the brown ceramic preform assembly 100, the atmosphere of the furnace may be appropriately controlled. For example, some ceramics, like alumina, can be sintered in air while other ceramics, like silicon carbide, must avoid oxidation and should be sintered in an inert atmosphere. Thermal debinding and sintering may be conducted in one continuous cycle inside one and the same furnace. In such a case, the brown ceramic preform assembly 100 is gradually heated from room temperature to sintering temperature and the thermal debinding process occurs during the gradual heating process.

The ceramic preform 110 is thus, formed in operation S10 as part of a ceramic preform assembly 100, described further below, by executing steps S12, S14, and S16, as appropriate. The above-described thermal debinding, sintering, and the subsequent steps may be the same or similar for different 3D printing processes (e.g., the same or similar for fused filament fabrication and binder jetting).

After the ceramic preform assembly 100 is formed (operation S10) and, more specifically, after sintering in step S16, a molten/liquid metal is brought into contact with the sintered ceramic preform 110, and the molten/liquid metal is introduced into the sintered ceramic preform 110 in operation S20. In this operation, the molten/liquid metal may infiltrate, permeate, or otherwise be deposited in or dispersed throughout the sintered ceramic preform 110 to form the metal matrix composite part. The term infiltrate will be used herein, and the molten metal may be thus referred to herein as a molten metal infiltrant. In the embodiments discussed herein, the infiltrant is a metal or metal alloy. The metal may comprise aluminum, magnesium, copper, titanium, iron, nickel, chromium, niobium, zirconium, uranium, or a combination thereof. The infiltrant may be metal alloy, such as a metal, including the metals previously listed. The metal may be, for example, aluminum-based alloy, a magnesium-based alloy, a copper-based alloy, a titanium-based alloy, an iron-based alloy, a nickel-based alloy, a chromium-based alloy, a niobium-based alloy, a zirconium-based alloy, or a uranium-based alloy.

Figure 7:
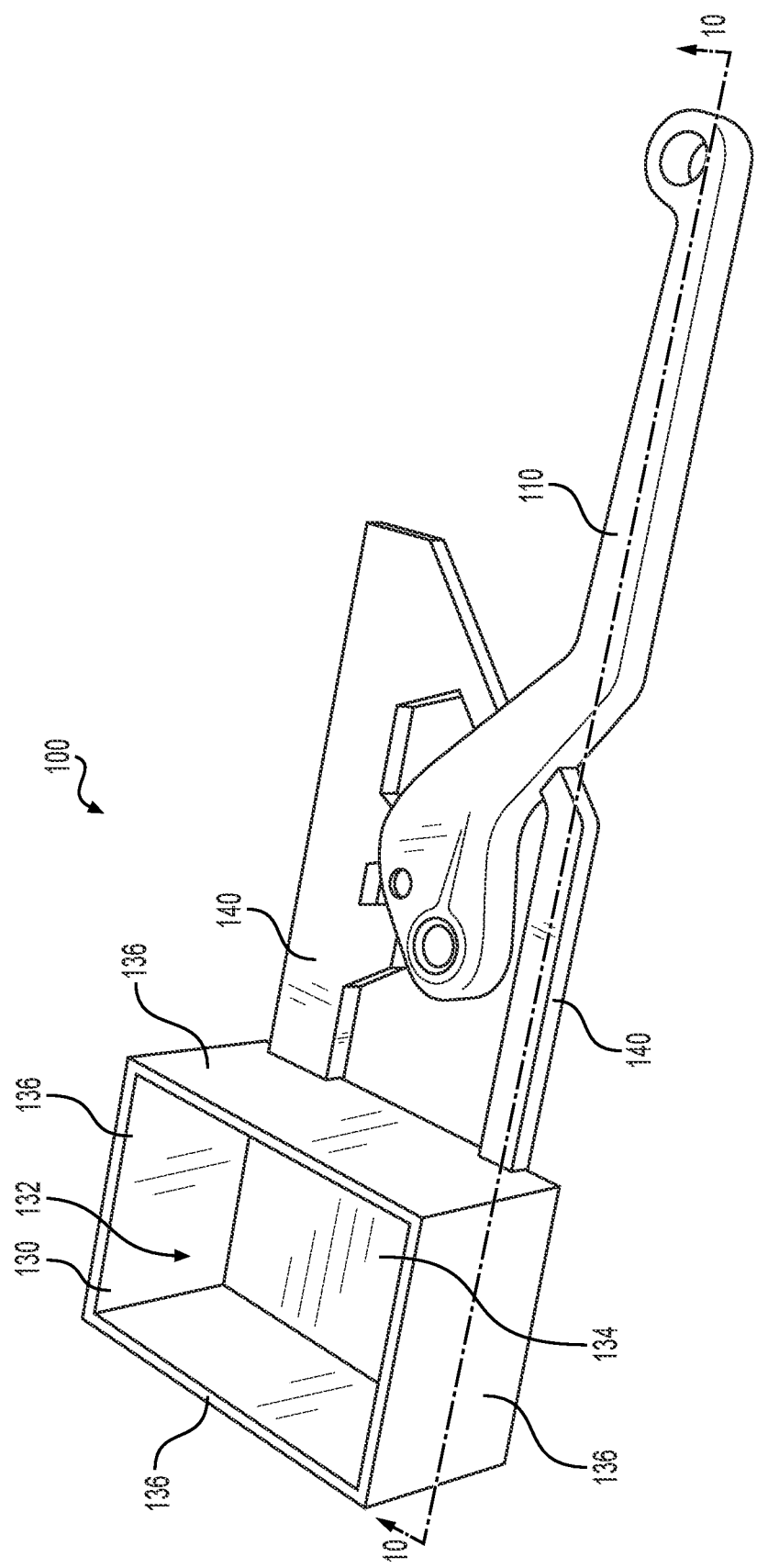
FIG. 7 shows an exemplary preform assembly printed using a 3D printing process.

In preferred embodiments discussed herein, the infiltration step is performed using the sintered ceramic preform assembly 100. FIG. 7 shows an exemplary preform assembly 100. As discussed above, the ceramic preform assembly 100 includes the ceramic preform 110. The ceramic preform assembly 100 also includes at least one infiltrant reservoir 130. The preform assembly 100 shown in FIG. 7 includes one infiltrant reservoir 130, but multiple infiltrant reservoirs 130 may be used depending upon the size and number of the ceramic preform 110 to be infiltrated. In addition, while FIG. 7 shows one ceramic preform 110, multiple ceramic preforms 110 may be used to batch process multiple metal matrix composite parts at the same time (see FIG. 8). The infiltrant reservoir 130 includes an interior volume 132. In this embodiment, the infiltrant reservoir 130 is cuboidal, but any suitable shape may be used. The infiltrant reservoir includes a floor 134 and side walls 136, which in this embodiment are four side walls.

In this embodiment, the infiltrant reservoir 130 is co-printed with the ceramic preform 110 to form the ceramic preform assembly 100 as part of the 3D printing process (step S12) discussed above. The ceramic preform assembly 100 is thus printed as a unitary body, but in other embodiments, the infiltrant reservoir 130 may be printed separately from the ceramic preform 110. The infiltrant reservoir 130 may be printed using the same settings as preform, but the infiltrant reservoir 130 is preferably printed using 100% infill to have stronger floor 134 and side walls 136 after sintering. With a ceramic filament 234 used for printing between 58-62% volume percent ceramic (as discussed above), an infiltrant reservoir 130 printed using 100% infill will be at least 35% porous after the bisque sintering operation. In this embodiment, the infiltrant reservoir 130 is formed from the same ceramic stock material (ceramic filament 234) as the ceramic preform 110, but in other embodiments a different ceramic stock material may be used.

The infiltrant reservoir 130 is connected to the ceramic preform 110. In this embodiment, the ceramic preform assembly 100 further includes, one or more infiltrant runners in physical contact with the infiltrant reservoir 130 and the at least one ceramic preform 110 to connect the infiltrant reservoir 130 with the at least one ceramic preform 110. In the embodiment shown in FIG. 7, the infiltrant reservoir 130 is positioned laterally relative to the ceramic preform 110 and the infiltrant runners are arranged to convey molten infiltrant, as will be discussed further below, in a lateral direction and from the infiltrant reservoir 130 to the ceramic preform 110. Such infiltrant runners are thus referred to herein as lateral infiltrant runners 140 for clarity with other infiltrant runners discussed herein. In this embodiment, the lateral infiltrant runners 140 convey the molten infiltrant in a generally horizontal direction and may thus also be horizontal infiltrant runners.

The lateral infiltrant runners 140 may be physically attached to each of the infiltrant reservoir 130 and the ceramic preform 110. The lateral infiltrant runners 140 of this embodiment are also co-printed with the ceramic preform 110 to form the ceramic preform assembly 100 as part of the 3D printing process (step S12) discussed above, forming a unity body with the ceramic preform 110 and infiltrant reservoir 130. The lateral infiltrant runners 140 may be co-printed with at least one of the infiltrant reservoir 130 and the ceramic preform 110 and, in some cases, co-printed with both the infiltrant reservoir 130 and the ceramic preform 110 to form a unity body. In other embodiments, however, the lateral infiltrant runners 140 can be printed separately and then brought into physical contact with the infiltrant reservoir 130 and the ceramic preform 110 during infiltration set-up assembly. In this embodiment, the lateral infiltrant runners 140 are formed from the same ceramic stock material (ceramic filament 234) as the ceramic preform 110, but in other embodiments a different ceramic stock material may be used. The lateral infiltrant runners 140 shown in FIG. 7 have a cuboidal shape, but any suitable shape may be used.

Referring again to FIG. 1, optionally, surfaces of the sintered ceramic preform assembly 100 are coated with a release coating in step S40. The release coating may be applied to all of the exposed surfaces of the sintered ceramic preform assembly 100. In some embodiments, however, the release coating may be omitted from portions of the infiltrant reservoir 130, such as the inner surfaces of the floor 134 and side walls 136. Preferably, the release coating may be omitted from the inner surface of the floor 134 but applied to the inner surfaces of the side walls 136. The release coating prevents excess accumulation of the infiltrant on the surface of the ceramic preform 110 during the infiltration process. Any suitable release coating may be used including, for example, colloidal graphite. Surfaces that may be coated with the release coating may include, the ceramic preform 110 as well as the external surfaces of the side walls 136 of the infiltrant reservoir 130 and the lateral infiltrant runners 140.

Figure 8:
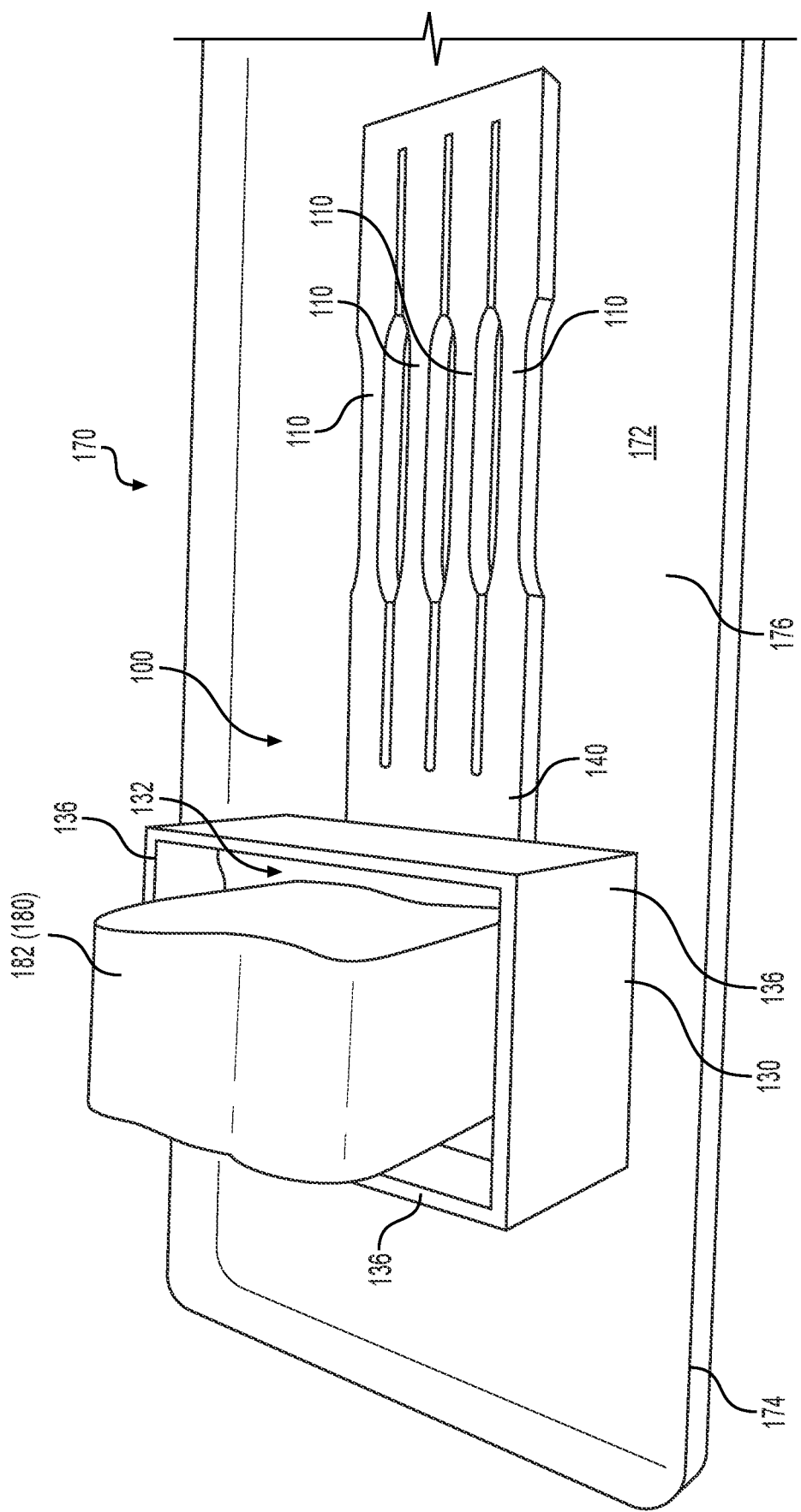
FIG. 8 shows another exemplary preform assembly placed on a graphite foil lined ceramic setter plate.

FIG. 8 shows an infiltration set-up 170 in connection with the operation S20 of infiltrating the ceramic preform assembly 100 with an infiltrant, which includes steps S22, S24, S26, and S28 (FIG. 1). In step S22 (FIG. 1), the sintered ceramic preform assembly 100 is placed on a flat surface. In a preferred embodiment, this surface is a graphite surface 172. A flat and parallel ceramic setter plate 174 may be used and the graphite surface 172 may be a graphite foil 176 placed in the ceramic setter plate 174. Other suitable forms of the graphite surface 172 may be used, however, including, for example, a graphite-coated surface, such as coating the top surface of the ceramic setter plate 174 with graphite to form the graphite surface 172. Accordingly, in this embodiment, the ceramic preform assembly 100 is placed on the ceramic setter plate 174 in step S22 (FIG. 1). In step S24 (FIG. 1), the infiltrant 180 (infiltrant material/infiltrant alloy) is placed as a solid metal 182 into the interior volume 132 of the infiltrant reservoir 130. The infiltrant reservoir 130 is used to contain the infiltrant 180 during the infiltration process.

Referring to FIG. 1, the infiltrant 180 is heated in step S26 to melt the solid metal 182 and held at an infiltration temperature for an infiltration time to allow the now molten infiltrant 184 (see FIG. 9A) is to come into contact with the ceramic preform 110 and infiltrate the ceramic preform assembly 100. The infiltration set-up 170 may be placed into a furnace, such as a flowing nitrogen atmosphere furnace, in the condition shown in FIG. 8. The temperature of the furnace is then raised to melt the infiltrant 180 and held at suitable times for the molten infiltrant 184 to flow from the interior volume 132 of the infiltrant reservoir 130 and infiltrate the ceramic preform 110.

Figure 9A:
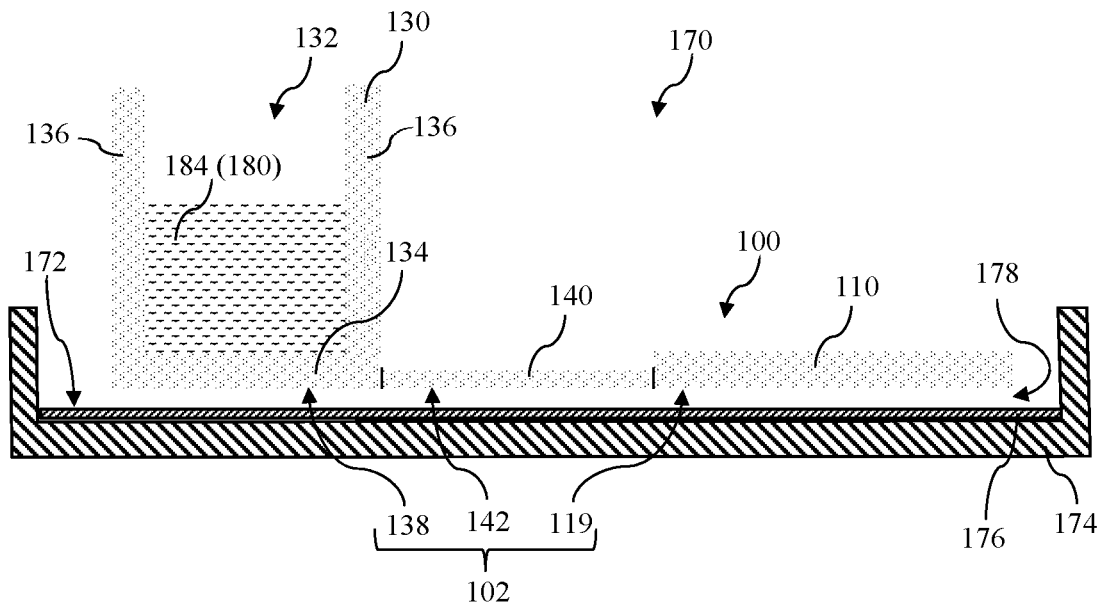
FIGS. 9A-9D illustrate how an infiltration process may occur.
Figure 9B:
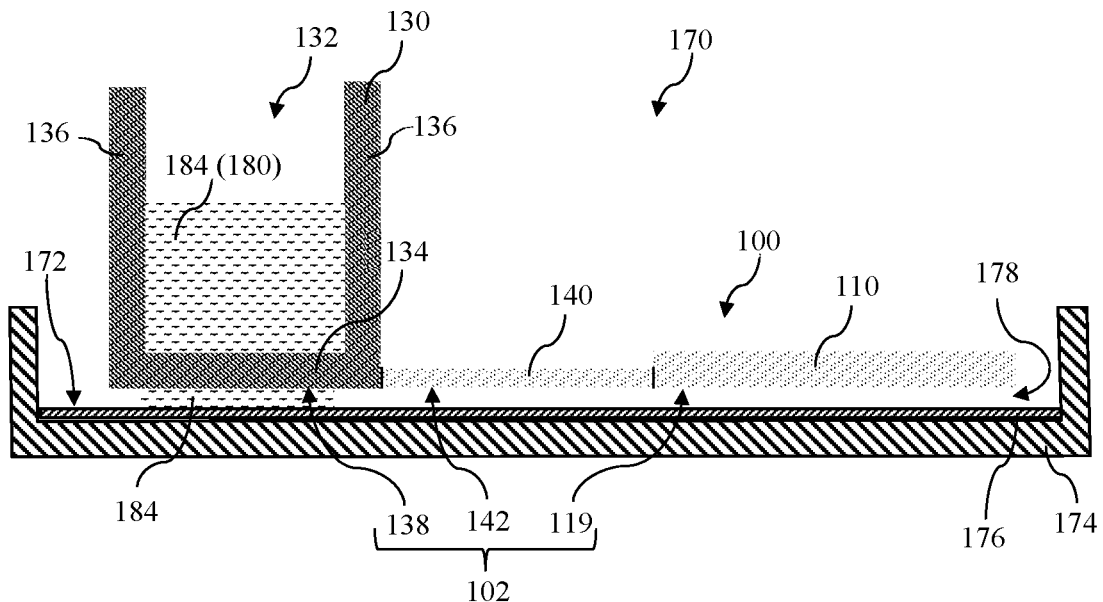
Figure 9C:
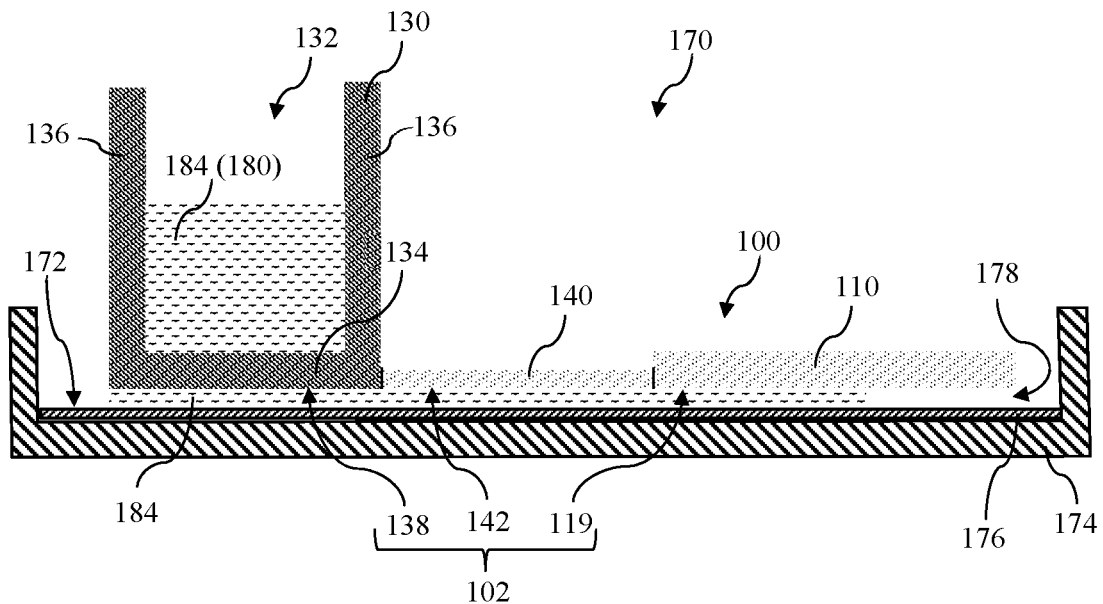
Figure 9D:
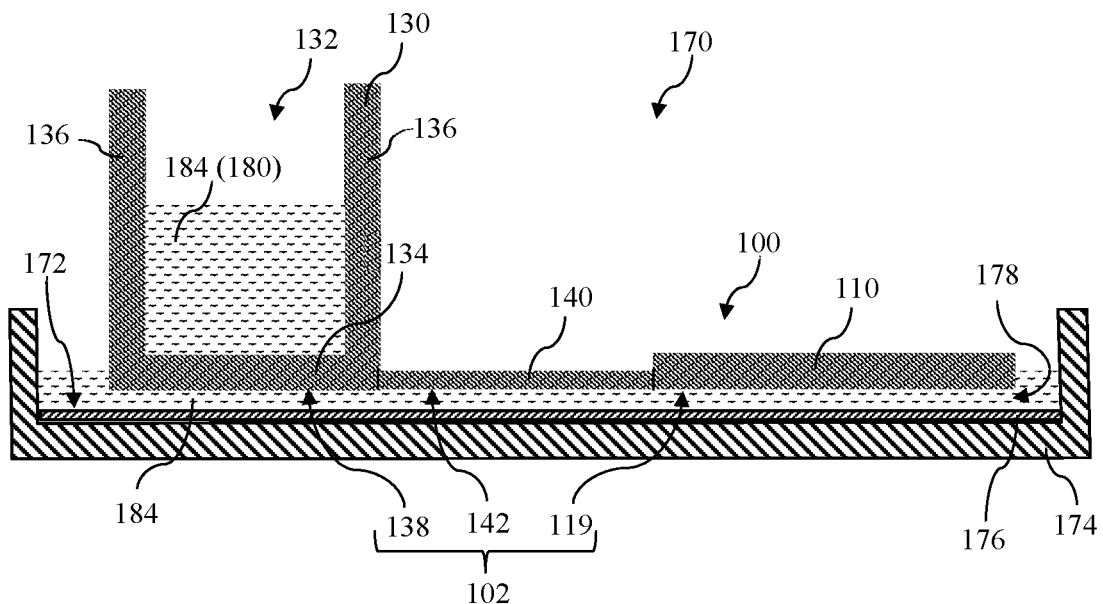

FIGS. 9A to 9D illustrate the heating and infiltration step (step S26), and without intending to be bound to any theory, the infiltration process may occur as follows. FIG. 9A shows a first time in the heating and infiltration step (step S26). FIG. 9B shows a second time, after the first time, in the heating and infiltration step (step S26). FIG. 9C shows a third time, after the second time, in the heating and infiltration step (step S26). FIG. 9D shows a fourth time, after the third time, in the heating and infiltration step (step S26). The ceramic preform assembly 100 in FIGS. 9A-9D is shown schematically in a cross-sectional view taken along line 10-10 in FIG. 7. In FIG. 9A, the temperature of the furnace has been raised to melt the solid metal 182 (FIG. 8) in the infiltrant reservoir 130. The molten infiltrant 184 is disposed in the interior volume 132 of the infiltrant reservoir 130. A bottom surface 138 of the infiltrant reservoir 130 and, more specifically, of the floor 134; a bottom surface 142 of the lateral infiltrant runners 140; and a bottom surface 119 of the ceramic preform 110 may be preferably printed (or otherwise assembled) so that they are co-planar with each other, but other configurations are also possible. As will be discussed further below, for example, the ceramic preform 110 may stand on stilts 160 that rest on a top face 144 of the lateral infiltrant runners 140. The bottom surface 138 of the floor 134, the bottom surface 142 of the lateral infiltrant runners 140, and the bottom surface 119 of the ceramic preform 110 are collectively referred to herein as bottom co-planar surfaces 102 of the ceramic preform assembly 100. The bottom co-planar surfaces 102 of the sintered ceramic preform assembly 100 contact the graphite surface 172 and form a narrow gap 178 between the bottom co-planar surfaces 102 and the graphite surface 172. The gap 178 is not to scale in FIGS. 9A-9D for illustration purposes. In this embodiment, the gap 178 is the inherent distance between one object (the ceramic preform assembly 100) with a planar surface (bottom co-planar surfaces 102) sitting on another planar surface (graphite surface 172 of the graphite foil 176). To the extent any features are formed on the bottom co-planar surfaces 102 and/or graphite surface 172 to set the gap 178, such features should be small enough to allow capillary action of the molten infiltrant 184.

As shown in FIG. 9B, the molten infiltrant 184 flows out of the infiltrant reservoir 130 and into the gap 178 between the bottom surface 138 of the floor 134 of the infiltrant reservoir 130 and the graphite surface 172. In this embodiment, the infiltrant reservoir 130 and, more specifically, the floor 134 does not include holes, channels, or other discrete cavities for the molten infiltrant 184 to flow out of the interior volume 132 of the infiltrant reservoir 130. Instead, the floor 134 and the side walls 136 of the infiltrant reservoir 130 are solid, but porous ceramic structures. The infiltrant alloy infiltrates the floor 134 and the side walls 136 of the infiltrant reservoir 130 first (since infiltrant reservoir 130 is porous, same as the ceramic preform 110), and then the molten infiltrant 184 reaches the gap 178 between the bottom surface 138 of the floor 134 and the graphite surface 172. Portions of the ceramic preform 110 that have been infiltrated by the infiltrant have a darker cross-sectional shading.

As shown in FIG. 9C, the narrow gap 178 between the bottom co-planar surfaces 102 and the graphite surface 172 acts as a large surface area capillary through which the infiltrant alloy (molten infiltrant 184) spreads horizontally. The molten infiltrant 184 continues to spread through the gap 178 under the bottom surface 138 of the floor 134 until reaching the bottom surface 142 of the lateral infiltrant runners 140. The molten infiltrant 184 then spreads under the lateral infiltrant runners 140, to the ceramic preform 110 and starts to spread under the bottom surface 119 of the ceramic preform 110, as well.

The molten infiltrant 184 envelops the lateral infiltrant runners 140 and the ceramic preform 110. After envelopment, the molten infiltrant 184, as shown in FIG. 9D, infiltrates the bulk of the lateral infiltrant runners 140 and the ceramic preform 110 in an outside-in fashion by capillary action with the molten infiltrant 184 flowing up from the gap 178 and into the ceramic preform 110 from the bottom and/or sides.

Returning to FIG. 1, the infiltrated ceramic preform assembly 100 and, more specifically, the infiltrated ceramic preform 110 is cooled forming the metal matrix composite part from the infiltrated ceramic preform 110 in step S28. The furnace is then cooled allowing the infiltrant 180 to solidify in the sintered ceramic preform 110 to form the metal matrix composite part. The infiltration set-up 170 is then removed from the furnace for post processing. The metal matrix composite part can be released from the infiltrated preform assembly 100 by, for example, cutting it off from the lateral infiltrant runners 140 (and stilts 160). The metal matrix composite part is thus not bound to excess infiltrant alloy directly and can be easily released by cutting it off from the lateral infiltrant runners 140 (and stilts 160). As such, this allows increased amounts of infiltrant alloy to be used to reduce the risk of un-infiltrated spots in metal matrix composite part due to a deficit of the infiltrant, while avoiding risks of a metal matrix composite part being bonded to large volumes of excess infiltrant alloy, which are difficult to remove.

Figure 10:
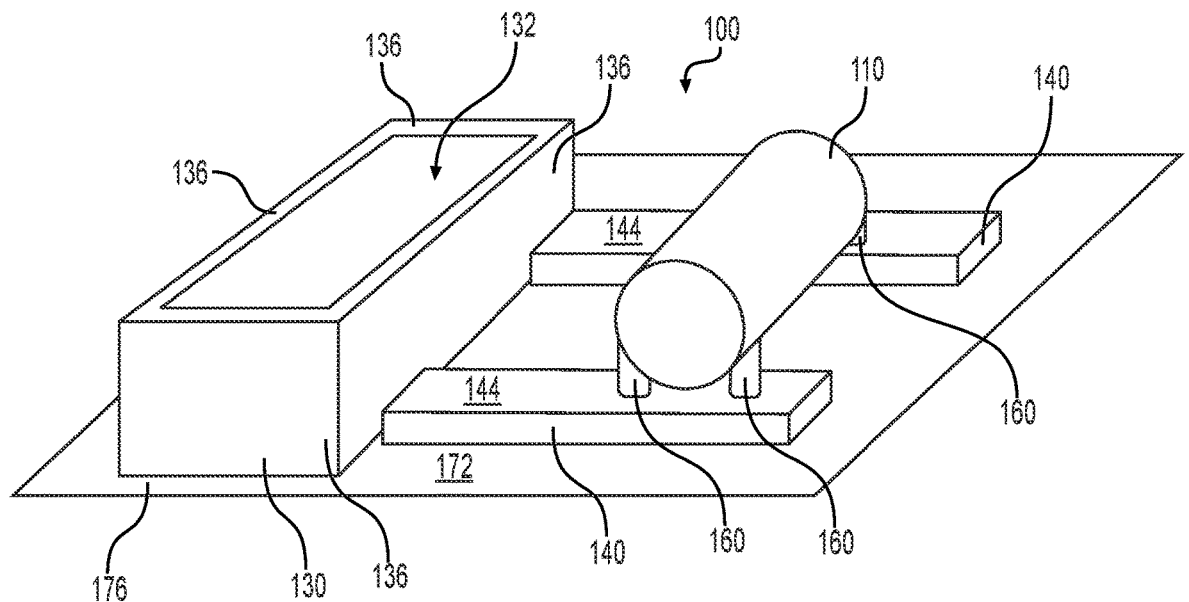
FIG. 10 shows another exemplary ceramic preform assembly.

FIG. 10 shows an exemplary ceramic preform 110 with a more complex (e.g., non-planar) bottom surface 119. The preform shown in FIGS. 7 and 8 has a generally flat (planar) bottom surface 119, but the 3D printing processes discussed herein can be used to create ceramic preforms 110, and thus metal matrix composite parts, with more complex shapes. The ceramic preform 110 shown in FIG. 10 is cylindrical having a curved bottom surface 119. To use the process discussed herein with such sintered preforms 110, the ceramic preform 110 may be connected to the lateral infiltrant runners 140 using a plurality of upright infiltrant runners. These upright infiltrant runners are oriented in a generally vertical direction and herein, these vertical infiltrant runners will be referred to as stilts 160. The vertical direction is the direction of gravity and, as shown in FIG. 10, the vertical direction is a direction normal to the graphite surface 172 and/or the top face 144 of the lateral infiltrant runners 140. The ceramic preform 110 stands on stilts 160 that rest on a top face 144 of the lateral infiltrant runners 140, such that at least a portion of the ceramic preform 110 are positioned above the lateral infiltrant runners 140 in a vertical direction.

The stilts 160 of this embodiment are also co-printed with the ceramic preform 110 to form the ceramic preform assembly 100 as part of the 3D printing process discussed above. But as noted above, the stilts 160 could be printed separately and attached to the ceramic preform 110. In this embodiment, the stilts 160 are formed from the same ceramic stock material as the ceramic preform 110, but as noted above other ceramic materials may be used. In addition, the stilts 160, like the lateral infiltrant runners 140 and the infiltrant reservoir 130 may have a 100% infill. The molten infiltrant 184 will, in the step shown in FIG. 9D, infiltrate the sintered ceramic preform 110 by, without intending to be bound to any theory, flowing over and through the stilts 160. The stilts 160 shown in FIG. 10 are cylindrical, but the stilts 160 may have any suitable shape to connect the lateral infiltrant runners 140 with the sintered ceramic preform 110. Other shapes include shapes with, for example, rectangular, triangular, hexagon, or elliptical cross sections.

Figure 11:
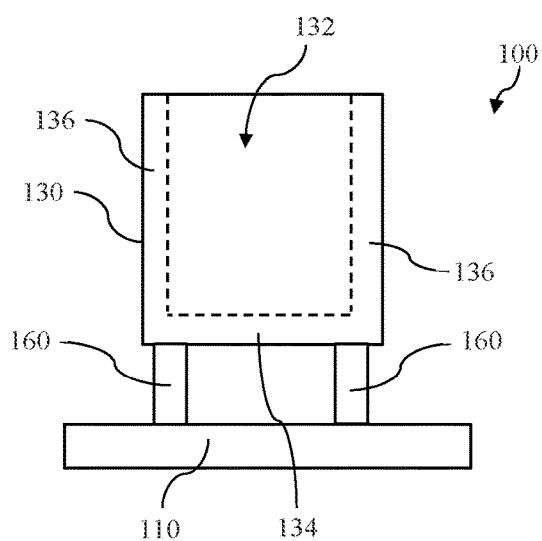
FIG. 11 shows another exemplary ceramic preform assembly.

FIG. 11 shows another arrangement of the infiltrant reservoir 130 connected to the ceramic preform 110. In this embodiment, shown in FIG. 7, the infiltrant reservoir 130 is placed laterally (to the side) of the ceramic preform 110. In this embodiment, the infiltrant reservoir 130 is positioned at a level higher than the ceramic preform 110 and, more specifically above the ceramic preform 110 in a vertical direction. The infiltrant reservoir 130 is connected to the ceramic preform 110 by stilts 160. During investigations by the inventors, the lateral arrangement was found to work better.

EXAMPLE

A plurality of tensile test specimens of a metal matrix composite was formed using the methods discussed herein. In this example, the preforms were printed from a spherical alumina powder, having an average particle size of 5 micrometers. The preforms were printed with an orthogonal infill geometry with a 60% infill density. The preform was co-printed with an infiltrant reservoir, forming the preform assembly shown in FIG. 8. This preform assembly was sintered in air at 1250° C. for a hold time of 3 hours. This preform was sintered to a bisque state where the preform can be handled, (picked and placed by hand), but sintering process proceeds only to initial stages, where necks between alumina particles are just starting to form and are not clearly visible even under scanning with an electron microscope.

An aluminum alloy was used as the infiltrant. In this embodiment, the aluminum alloy comprised magnesium as an alloying element to enhance the wettability of the aluminum alloy and thus the infiltration process. Suitable magnesium concentrations in the aluminum alloy are preferably between 2 and 20 percent by weight, and even more preferably between 5 and 10 percent by weight. In this example, the magnesium concentration in the aluminum alloy was 10 percent by weight.

A block of the aluminum alloy was placed into the infiltrant reservoir and the preform assembly was placed on a graphite foil in a ceramic setter plate as shown in FIG. 8. The setter plate, graphite foil, ceramic preform assembly, and infiltrant alloy was then placed into a flowing nitrogen atmosphere furnace. As discussed above, infiltration takes place in the furnace at various temperatures, such as between 800° C. and 1100° C. and, preferably, between 900° and 1000° C., for a suitable period of time, such as from 5 hours to 15 hours and, preferably, from 6 hours to 9 hours. In this example, infiltration was conducted in a high-purity, flowing nitrogen atmosphere at 900° C. for 7 hours. Under these conditions, the aluminum was able to infiltrate the ceramic preform to form metal matrix composite tensile specimens.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of manufacturing a metal matrix composite part, the method comprising:
    forming a ceramic preform using 3D printing, the ceramic preform being formed from ceramic particles, wherein forming the ceramic preform includes forming a channel in the ceramic preform;
    placing a plurality of fibers as fiber reinforcement during the 3D printing, wherein a fiber of the plurality of fibers is placed in the channel to form continuous fiber reinforcement;
    sintering the ceramic preform to form a sintered preform; and
    introducing a liquid metal into the sintered preform to form the metal matrix composite part.

2. The method of claim 1, wherein the 3D printing is one or more of extrusion printing, fused filament fabrication, binder jetting, or selected laser sintering.

3. The method of claim 1, wherein the ceramic preform is formed with a binder and the method further comprises removing the binder.

4. The method of claim 3, wherein the ceramic preform comprises a polymer binder filled with a ceramic particulate.

5. The method of claim 1, wherein placing a plurality of fibers includes 3D printing the plurality of fibers.

6. The method of claim 1, wherein forming the ceramic preform includes printing an outside shell and an internal infill.

7. The method of claim 6, wherein the internal infill is a gradient infill.

8. The method of claim 6, wherein the internal infill has a gyroid shape.

9. The method of claim 6, wherein the internal infill has a geometry, the geometry of the internal infill being a geometric pattern exhibiting a periodic structure.

10. The method of claim 1, wherein forming the ceramic preform includes forming a plurality of ceramic print layers by depositing a ceramic composite material in a pattern to form the ceramic print layer of the ceramic preform.

11. The method of claim 10, wherein the ceramic composite material comprises a polymer binder and a ceramic particulate.

12. A method of manufacturing a metal matrix composite part, the method comprising:
    forming a ceramic preform assembly using 3D printing, the ceramic preform assembly including at least one ceramic preform and an infiltrant reservoir connected to the ceramic preform, the ceramic preform assembly being formed from ceramic particles, wherein forming the ceramic preform includes forming a channel in the ceramic preform;
    placing a plurality of fibers as fiber reinforcement during the 3D printing, wherein a fiber of the plurality of fibers is placed in the channel to form continuous fiber reinforcement;
    sintering the ceramic preform assembly to form a sintered preform assembly including at least one sintered preform from the at least one ceramic preform; and introducing a liquid metal into the sintered preform to form the metal matrix composite part.

13. The method of claim 12, wherein the ceramic preform assembly further includes one or more infiltrant runners physically attached to the infiltrant reservoir and the at least one ceramic preform to connect the infiltrant reservoir with the at least one ceramic preform.

14. The method of claim 13, wherein the ceramic preform assembly further includes one or more infiltrant stilts, each infiltrant stilts connecting a portion of the ceramic preform to one of the infiltrant runners.

15. The method of claim 13, wherein the infiltrant reservoir includes an interior volume, and the method further comprises:
   placing a solid metal in the interior volume of the infiltrant reservoir; and
   heating the solid metal to form the liquid metal.

16. The method of claim 15, further comprising placing the ceramic preform assembly on a graphite surface.

* * * * *